US012643028B2

(12) United States Patent
Miller et al.

(10) Patent No.: US 12,643,028 B2
(45) Date of Patent: Jun. 2, 2026

(54) FOLDABLE LATERAL MOTION SYSTEM

(71) Applicant: New Modality Sports, Inc., Boston, MA (US)

(72) Inventors: Kenneth S. Miller, Maple Valley, WA (US); Jeffrey M. Miller, Montauk, NY (US)

(73) Assignee: New Modality Sports, Inc., Boston, MA (US)

( * ) Notice: Subject to any disclaimer, the term of this patent is extended or adjusted under 35 U.S.C. 154(b) by 0 days.

(21) Appl. No.: 18/446,211

(22) PCT Filed: Aug. 8, 2023

(86) PCT No.: PCT/US2023/071847
§ 371 (c)(1),
(2) Date: Aug. 8, 2023

(87) PCT Pub. No.: WO2024/036153
PCT Pub. Date: Feb. 15, 2024

(65) Prior Publication Data
US 2025/0161777 A1     May 22, 2025

Related U.S. Application Data

(60) Provisional application No. 63/396,451, filed on Aug. 9, 2022.

(51) Int. Cl.
A63B 69/00          (2006.01)
A63B 21/00          (2006.01)
(Continued)

(52) U.S. Cl.
CPC .... *A63B 69/0022* (2013.01); *A63B 21/00069* (2013.01); *A63B 21/015* (2013.01);
(Continued)

(58) Field of Classification Search
CPC .......... A63B 69/0022; A63B 21/00069; A63B 21/015; A63B 21/4034; A63B 21/4045;
(Continued)

(56) References Cited

U.S. PATENT DOCUMENTS

| | | |
|---|---|---|
| 4,544,153 A | 10/1985 | Babcock |
| 4,744,557 A | 5/1988 | Smirmaul |

(Continued)

FOREIGN PATENT DOCUMENTS

| | | |
|---|---|---|
| EP | 1537897 B1 | 9/2009 |
| WO | 9409858 A1 | 5/1994 |
| WO | 2019013617 A1 | 1/2019 |

*Primary Examiner* — Andrew S Lo
(74) *Attorney, Agent, or Firm* — Bradley Arant Boult Cummings LLP; Daniel E. Sineway, Esq.

(57) ABSTRACT

A system and methods for training lateral motions. The disclosed system can include an elongate core member having a proximal end and a distal end; a pivoting guide arm rotationally coupled to the proximal end of the elongate core member via a pivoting joint, the pivoting guide arm comprising a foot pedal opposite the pivoting joint for securing a foot of a user; and a resistance system mounted to the elongate core member, the resistance system comprising a brake drum affixed to the elongate core member and having a friction strap threaded therethrough, the friction strap being affixed to the pivoting guide arm and rotationally coupled to the elongate core member, wherein the friction strap is configured to apply a friction force to the brake drum as the foot pedal of the pivoting guide arm is pushed laterally away from the elongate core member.

17 Claims, 19 Drawing Sheets

(51) Int. Cl.
  *A63B 21/015*   (2006.01)
  *A63B 23/035*   (2006.01)
  *A63B 23/04*    (2006.01)
  *F16D 63/00*    (2006.01)

(52) U.S. Cl.
  CPC ...... *A63B 21/4034* (2015.10); *A63B 21/4045*
    (2015.10); *A63B 23/03541* (2013.01); *A63B*
     *23/04* (2013.01); *F16D 63/008* (2013.01);
      *A63B 2210/50* (2013.01); *A63B 2225/093*
       (2013.01); *A63B 2244/18* (2013.01)

(58) Field of Classification Search
  CPC .............. A63B 23/03541; A63B 23/04; A63B
    2210/50; A63B 2225/093; A63B 2244/18;
     A63B 21/0552; A63B 21/154; A63B
     21/4015; A63B 21/4047; A63B 21/4049;
     A63B 2220/51; A63B 2225/09; F16D
                63/008
  See application file for complete search history.

(56)       References Cited

U.S. PATENT DOCUMENTS

| | | | |
|---|---|---|---|
| 4,781,372 A | | 11/1988 | McComack |
| 5,749,811 A | * | 5/1998 | Wilson ................... A63B 69/18 |
| | | | 482/71 |
| 7,115,073 B2 | * | 10/2006 | Nizamuddin ...... A63B 69/0022 |
| | | | 482/79 |
| 7,959,544 B2 | * | 6/2011 | Palmer ................. A63B 22/203 |
| | | | 482/130 |

\* cited by examiner

FOLDABLE LATERAL MOTION SYSTEM

CROSS-REFERENCE TO RELATED APPLICATIONS

This PCT application claims the benefit of, and priority to, U.S. Provisional Patent App. No. 63/396,451, filed on Aug. 9, 2022, and entitled "FOLDABLE SKATE TRAINING SYSTEM," the disclosure of which is incorporated by reference in its entirety as if the same were fully set forth herein.

TECHNICAL FIELD

This application generally relates to systems and methods for lateral training and more specifically to a lateral motion system for performing skating like motions on none-ice surfaces.

BACKGROUND

For the last few decades, exercise machines have grown in popularity for the home consumer. Many of these exercise machines are focused on the key exercise routines prevalent in today's society. For example, there are many exercise bikes, treadmills, elliptical machines, rowers, etc. Many of these exercise machines are large and require a substantial amount of space. Moreover, storage can be cumbersome due to their size. Many of the exercise machines use powered (e.g., electronic) mechanisms for their functionalities, which requires spaces that have access to electricity. Additionally, there are few exercise machines dedicated to training lateral movements.

Therefore, there is a long-felt but unresolved need for a system that allows a user to train lateral movement, has a minimal footprint in a particular space during use, does not use any powered devices, can be stored in a confined and minimally intrusive space, and can be moved and deployed at any particular location.

BRIEF SUMMARY OF THE DISCLOSURE

Briefly described, and according to one embodiment, aspects of the present disclosure generally relate to apparatuses, systems, and methods for a lateral motion system designed to emulate the motion and feeling of ice skating or inline skating on a non-ice surface. The lateral motion system can include a lightweight articulating frame connected to a core supporting at least two pivoting guide arms. The pivoting guide arms can include a foot pedal attached to the end of each of the pivoting guide arms. The foot pedal located at the end of each pivoting guide arm can be defined as a slideable foot holster for receiving the feet of a user and sliding along the articulating frame. The lateral motion system can promote a motion substantially similar to ice skating, inline skating (e.g., roller blading), skiing, and/or any particular analogous motion. Each pivoting guide arm can guide the foot pedal in an arced path. The foot pedals and the pivoting guide arms can roll on roller struts of the articulating frame.

The foot pedals can each include a foothold for accepting the feet of a user. The user standing on the foot pedals can alternately shift his or her weight from one foot to the other and can simultaneously push out to the side. The pivoting guide arms can direct the user in an ergonomically correct skating stroke.

Each pivoting guide arm can connect to an adjustable friction resistance system. The friction resistance system can be located at the core of the lateral motion system. The friction resistance system can provide a resistance force that works against the user while operating the lateral motion system. For example, the friction resistance system can attach to each pivoting guide arm of the lateral motion system. Continuing this example, the friction resistance system can provide a variable amount of force to each pivoting guide arm. Continuing this example, the force applied to each pivoting guide arm can act in the opposite direction of movement of the pivoting guide arm as the user pushes away from the center of the lateral motion system.

The articulating frame and pivoting guide arms can be tilted incrementally on either side of the core using riser blocks or another height adjustment mechanism. For example, the riser blocks can be placed at the base of the distal ends of the articulating frame relative to the core. Continuing this example, the pivoting guide arm can travel up the elevated articulating frame, creating a greater force on the user as he or she pushes away from the core. In another example, the riser blocks can be placed under the core to raise the core relative to the distal ends of the articulating frame. Varying the slope of the articulating frame relative to the core can allow user to feel a greater force as their legs push the pivoting guide arms across the inclined roller struts and away from the core. By increasing the incline of the roller struts, the user can be forced to use more effort pushing the pivoting guide arm up the roller struts. The combination of varying the slope of the articulating frame and the force produced by the friction resistance system can provide a variety of workout experiences for the user.

The lateral motion system can include a computing system for managing the functionalities of the lateral motion system. For example, the computing system can interact with a mobile device such that the mobile device can send the computing system exercise selections for a particular exercise routine performed on the lateral motion system. The computing system can manage controls associated with the adjustable friction resistance system. For example, the computing system can vary the forces applied to each pivoting guide arm in accordance with the exercise routine to provide the user with a variable intensity workout. The computing system can include various sensors to measure one or more attributes associated with the performance of the lateral motion system and/or the user.

The foot pedals can include a pivoting mechanism. The pivoting mechanism can allow the user to rotate his or her feet in a natural motion similar to motions performed while skating. For example, the pivoting mechanism of the foot pedals can allow the feet of the user to adequately perform an internal/external rotation motion and/or an inversion/eversion motion.

According to a first aspect, an exercise apparatus, comprising: A) an elongate core member having a proximal end and a distal end; B) a pivoting guide arm rotationally coupled to the proximal end of the elongate core member via a pivoting joint, the pivoting guide arm comprising a foot pedal opposite the pivoting joint for securing a foot of a user; and C) a resistance system mounted to the elongate core member, the resistance system comprising a brake drum affixed to the elongate core member and having a friction strap threaded therethrough, the friction strap being affixed to the pivoting guide arm and rotationally coupled to the elongate core member, wherein the friction strap is configured to apply a friction force to the brake drum as the foot pedal of the pivoting guide arm is pushed laterally away from the elongate core member.

According to a further aspect, the exercise apparatus of the first aspect or any other aspect, further comprising a roller strut coupled to the distal end of the elongate core member, wherein the foot pedal of the pivoting guide arm is configured to roll or slide along the roller strut when the pivoting guide arm is pushed laterally away from the elongate core member.

According to a further aspect, the exercise apparatus of the first aspect or any other aspect, further comprising a support strut rotationally coupled to the pivoting joint and extending outwardly from the elongate core member, wherein the support strut is rotationally coupled to the roller strut via an elbow connection.

According to a further aspect, the exercise apparatus of the first aspect or any other aspect, wherein the pivoting joint further comprises an outrigger having a first end and a second end, the outrigger being configured to: A) rotationally couple to the elongate core member at the first end and rotationally couple to the support strut and the pivoting guide arm at the second end; and B) rotate about a horizontal axis at the first end.

According to a further aspect, the exercise apparatus of the first aspect or any other aspect, wherein the roller strut is coupled to the distal end of the elongate core member via a locking joint, wherein the locking joint further comprises a removable locking pin that is further configured to: A) secure the roller strut to the locking joint when in a locked position; and B) release the roller strut from the locking joint when in an unlocked position.

According to a further aspect, the exercise apparatus of the first aspect or any other aspect, wherein the roller strut is configured to pivot, when in the unlocked position, towards the support strut about the elbow connection, and wherein the support strut and the pivoting guide arm are configured to pivot about the pivoting joint towards the elongate core member.

According to a further aspect, the exercise apparatus of the first aspect or any other aspect, wherein the elbow connection is configured to be raised from a generally horizontal position by pivoting the outrigger and the support strut about the horizontal axis of the outrigger and pivoting the roller strut, when in the locked position, about the locking joint.

According to a further aspect, the exercise apparatus of the first aspect or any other aspect, wherein the resistance system further comprises: A) a brake assembly base comprising a brake pin and a stationary brake pad, the brake pin and the stationary brake pad extending perpendicularly from the brake assembly base; B) an attachment aperture in the brake drum, the brake assembly base being rotationally coupled to the brake drum by extending the brake pin through the attachment aperture; and C) a variable brake pad secured to the brake drum; wherein the friction strap is operatively threaded between the brake drum and the stationary brake pad, wherein the friction strap is affixed to the pivoting guide arm at a first end and affixed to an elastic cord at a second end, wherein a stationary end of the elastic cord is rotationally coupled to the elongate core member.

According to a further aspect, the exercise apparatus of the first aspect or any other aspect, wherein the friction force applied to the brake drum by the friction strap is configured to induce a torque onto the brake drum such that the brake drum rotates about the brake pin; and in response to the brake drum rotating about the brake pin, the brake drum is configured to generate a compression force on the friction strap by squeezing the friction strap between the variable brake pad and the stationary brake pad.

According to a further aspect, the exercise apparatus of the first aspect or any other aspect, wherein: A) the pivoting guide arm is configured to release a tension on the friction strap in response to the pivoting guide arm moving medially towards the elongate core member; B) in response to releasing the tension on the friction strap, the elastic cord is configured to induce a return force on the pivoting guide arm through the friction strap, thereby reducing the torque on the brake drum; and C) in response to reducing the torque on the brake drum, the brake drum is configured to reduce the compression force between the between the variable brake pad and the stationary brake pad.

According to a second aspect, a lateral motion system for training lateral movements, comprising: A) a core member having a proximal end and a distal end; B) a pivoting guide arm rotationally coupled to the proximal end of the core member via a pivoting joint, the pivoting guide arm comprising a foot pedal opposite the pivoting joint for securing a foot of a user; and C) a resistance system mounted to the core member, the resistance system comprising a brake member affixed to the core member and having a friction strap coupled thereto, the friction strap being affixed to the pivoting guide arm and configured to apply a friction force to the brake member as the foot pedal of the pivoting guide arm is pushed laterally away from the core member.

According to a further aspect, the lateral motion system of the second aspect or any other aspect, wherein the resistance system further comprises: A) a brake assembly base comprising a brake pin and a stationary brake pad, the brake pin and the stationary brake pad extending perpendicularly from the brake assembly base; B) an attachment aperture in the brake member, the brake assembly base being rotationally coupled to the brake member by extending the brake pin through the attachment aperture; and C) a variable brake pad secured to the brake member; wherein the friction strap is operatively threaded between the brake member and the stationary brake pad, wherein the friction strap is affixed to the pivoting guide arm at a first end and affixed to an elastic cord at a second end, wherein a stationary end of the elastic cord is rotationally coupled to the core member.

According to a further aspect, the lateral motion system of the second aspect or any other aspect, wherein the friction force applied to the brake member by the friction strap is configured to induce a torque onto the brake member such that the brake member rotates about the brake pin; and in response to the brake member rotating about the brake pin, the brake member is configured to generate a compression force on the friction strap by squeezing the friction strap between the variable brake pad and the stationary brake pad.

According to a further aspect, the lateral motion system of the second aspect or any other aspect, wherein: A) the pivoting guide arm is configured to release a tension on the friction strap in response to the pivoting guide arm moving medially towards the core member; B) in response to releasing the tension on the friction strap, the elastic cord is configured to induce a return force on the pivoting guide arm through the friction strap, thereby reducing the torque on the brake member; and C) in response to reducing the torque on the brake member, the brake member is configured to reduce the compression force between the between the variable brake pad and the stationary brake pad.

According to a further aspect, the lateral motion system of the second aspect or any other aspect, wherein the brake member comprises a shape selected from the group consisting of a cylinder, a half cylinder, a cam, a rounded triangular prism, a rounded rectangular prism, and an arcuate shape.

According to a further aspect, the lateral motion system of the second aspect or any other aspect, wherein the foot pedal includes a movement apparatus for enabling smooth movement of the pivoting guide arm, the movement apparatus comprising at least one of a roller ball bearing system, a rolling pin, a wheel, a slidable ball, or a slidable track assembly.

According to a third aspect, a training apparatus, comprising: A) a friction resistance system, the friction resistance system further comprising: 1) a brake assembly base comprising a brake pin and a stationary brake pad, the brake pin and the stationary brake pad extending perpendicularly from the brake assembly base; 2) a brake drum comprising an attachment aperture, the brake assembly base rotationally coupled to the brake drum via the brake pin extended through the attachment aperture; 3) a variable brake pad secured to the brake drum via a sliding adjustment means; and 4) a friction strap operatively threaded between the brake drum and the stationary brake pad, the friction strap fixed to a guide arm at a first end and fixed to base member at a second end.

According to a further aspect, the training apparatus of the third aspect or any other aspect, wherein the training apparatus is further configured to: A) pull the friction strap as the guide arm moves away from the friction resistance system; B) in response to pulling the friction strap, the friction strap is configured to apply a frictional force onto the brake drum inducing a torque onto the brake drum such that the brake drum rotates about the brake pin; and C) in response to the brake drum rotating about the brake pin, the brake drum is configured to generate a compression force on the friction strap by pressing the variable brake pad into the friction strap and into the stationary brake pad.

According to a further aspect, the training apparatus of the third aspect or any other aspect, wherein the training apparatus is further configured to: A) release a tension on the friction strap in response to the guide arm moving towards the friction resistance system; B) in response to releasing the tension on the friction strap, the elastic cord is configured to induce a return force on the guide arm through the friction strap; C) in response to inducing the return force on the guide arm, the frictional force and the torque induced on the brake drum subsides; and D) in response to the frictional force and the torque subsiding, the brake drum is configured to reduce the compression between the variable brake pad and the stationary brake pad, releasing the friction strap and reducing the variable resistance force on the guide arm.

According to a further aspect, the training apparatus of the third aspect or any other aspect, wherein the training apparatus comprises a lateral motion trainer configured to simulate the motion of ice skating or inline skating.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
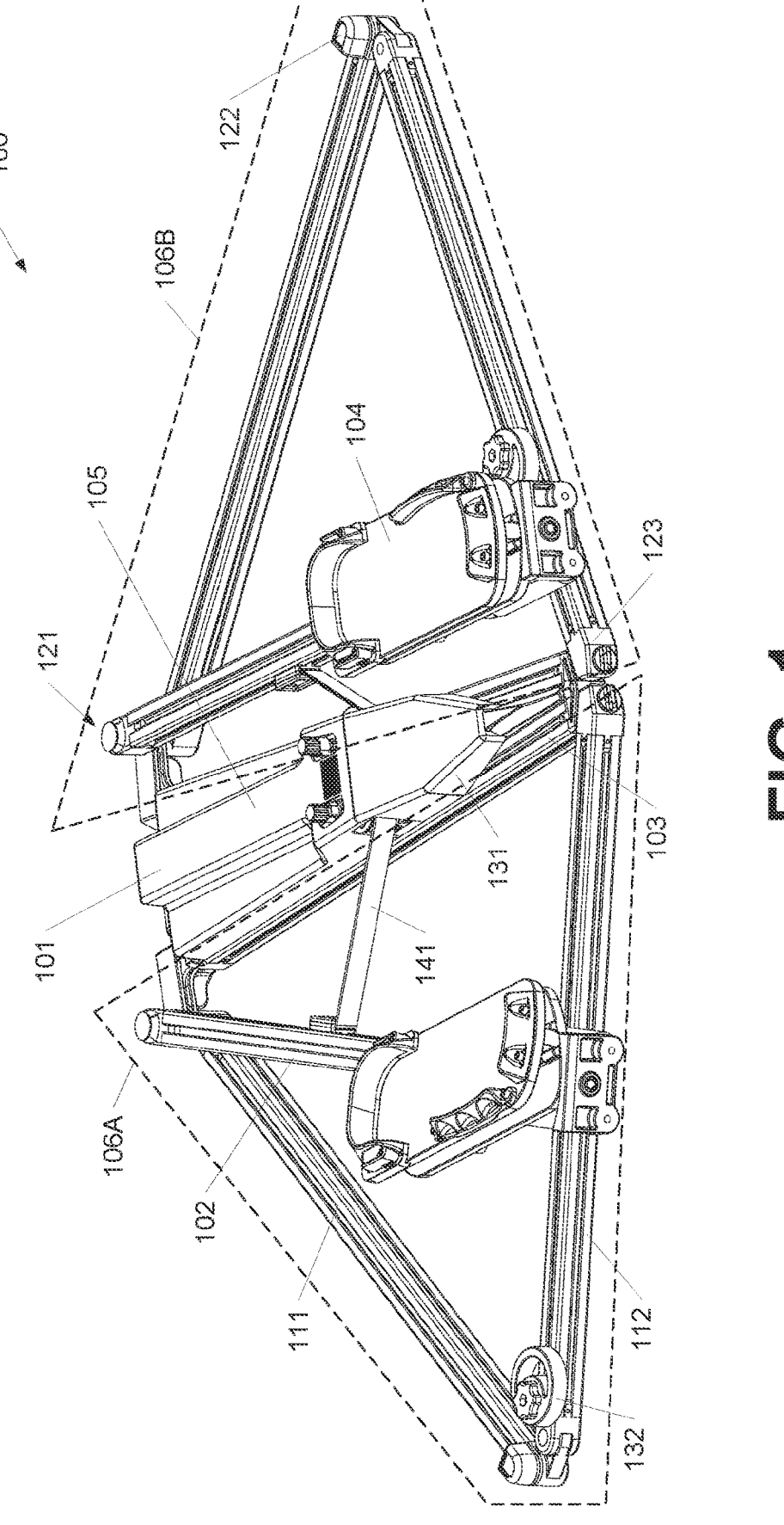
FIG. 1 illustrates a perspective view of a lateral motion system, according to one example of the disclosed technology.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure can generally relate to a lateral motion system used to emulate the motion and feeling of ice skating or inline skating on a non-ice surface. The lateral motion system can include a core, articulating frames, pivoting guide arms, and a friction resistance system. The lateral motion system can accept the feet of a user. The lateral motion system can support the weight of a user. A user can push his or her legs along the lateral motion system in a lateral direction to mimic the motion executed while ice skating, inline skating (e.g., roller blading), and/or accelerating when skiing. The lateral motion system can include various pivot joints for easy maneuverability, exercise variation, and folding for storage.

The core of the lateral motion system can include a first and second angled strut. The two angled struts can support the friction resistance system. The articulating frames can include a support strut and a roller strut extending from the core. For example, the first angled strut, the roller strut, and the support strut can connect to form a triangle. The second angled strut can have a substantially identical formation between a second roller strut and a second support strut to form two articulating frames on opposite sides of the core.

The pivoting guide arms and the support struts can attach at a pivoting location at a first end of the core. For example, the pivoting guide arms can rest vertically above the support struts and connect to rotate about the pivoting location. Similar to a pendulum, the pivoting guide arms can rotate about the pivoting location as a user performs a skating motion.

The pivoting guide arms can each include a foot pedal for accepting the feet of the user. The foot pedals can rest on the roller struts and glide across the roller struts to facilitate movement of the user's body. Each foot pedal can include at least one cylindrical roller at its base in contact with the roller struts. The cylindrical rollers can roll across the roller struts as the user applies a force to the pivoting guide arms and moves laterally relative to the core. Other forms of movement mechanisms can facilitate the movement of the foot pedals along the roller struts. For example, the foot pedals can include a ball caster or any spherical rolling device at the base of the foot pedals that rolls along the roller struts. In another example, the top surface of the roller struts and the base of the foot pedals can be formed out of two low friction materials that facilitate movement between the two surfaces. In another example, the roller struts can include a raised central surface that can receive an hourglass hexagon at the base of the foot pedals. Continuing this example, the raised surface can insert into the recessed portion of the hourglass hexagon as the foot pedals move along the roller struts. In another example, the base of the foot pedals can include a structure of constant width (e.g., reuleaux triangle) along at least one plane to roll along the roller struts.

The foot pedals can include a pivoting mechanism for inducing a pivoting motion in the feet of the user. The pivoting mechanism can allow the user to move his or her feet in a natural motion similar to motions performed while skating. For example, the pivoting mechanism of the foot pedals can allow the feet of the user to adequately perform internal/external rotation motion and/or an inversion/eversion motion. The foot pedals can include pivoting footplates for inducing the pivoting motion. The pivoting footplates can rotate about the center of the foot pedal (e.g., a longitudinal axis) and along a sagittal axis. The pivoting footplates can be locked into place for any particular configuration specified by the user. The pivoting footplates can allow the user to customize the foot angle specifically for more comfortable positioning.

The friction resistance system can attach to the pivoting guide arms. The friction resistance system can apply a variable amount of force to each of the pivoting guide arms to increase or decrease the difficulty of the exercise. The friction resistance system can include a brake assembly, friction straps, and an elastic return system. As a user pushes the pivoting guide arm away from the core, the friction strap can initiate the brake assembly. The friction strap can include a first end attached to the pivoting guide arm. As the pivoting guide arm moves away from the core, the pivoting guide arm can pull on the friction strap. The brake assembly can apply a clamping force on the friction strap as the pivoting guide arm moves further away from the core. The brake assembly can adjust to increase or decrease the clamping force produced by the system. The elastic return system can connect to a second end of the friction strap. The elastic return system can increase the force exerted on the pivoting guide arms by pulling the friction straps in the opposite direction of motion relative to the pivoting guide arms.

The lateral motion system can include a computing system for managing the functionalities of the lateral motion system. In one example, the computing system can be a central computing source interacting with a local processor on the lateral motion system. In another example, the computing system can be a local computing system integrated into the lateral motion system. The computing system can include a display for displaying properties (e.g., exercises, performance metrics, goals, etc.) to the user. The computing system can interact with other nearby computing devices. For example, the computing system can interact with a mobile device such that the mobile device can send the computing system exercise selections for a particular exercise routine performed on the lateral motion system. The computing system can manage controls associated with the adjustable friction resistance system. For example, the computing system can vary the forces applied to each pivoting guide arm in accordance with the exercise routine to provide the user with a variable intensity workout. The computing system can include various sensors to measure one or more attributes associated with the performance of the lateral motion system and/or the user.

The lateral motion system can include removable stroke limits. The removable stroke limits can attach to the roller struts and reduce the range of motion of the pivoting guide arms. The removable stroke limits can be placed at any location on the roller struts.

Example Embodiments

Referring now to the figures, for the purposes of example and explanation of the fundamental processes and components of the disclosed apparatuses, systems, and methods, reference is made to FIG. 1, which illustrates an example, high-level overview of a lateral motion system 100. As will be understood and appreciated, the example, high-level overview of the lateral motion system 100 shown in FIG. 1 represents merely one approach or embodiment of the present disclosure, and other aspects are used according to various embodiments of the present disclosure.

The lateral motion system 100 can be used to simulate the motion of ice skating, inline skating, or other similar movements in a non-ice environment. During use, the lateral motion system 100 can be placed on the ground. For example, the lateral motion system 100 can be placed on a hardwood floor of a home. The user can mount the lateral motion system 100 and can perform a skating motion substantially similar to skating motions performed on ice. The user can practice other motions similar to skating such as skiing and snow hiking.

The lateral motion system 100 can include a core 101, pivoting guide arms 102, angled struts 103, foot pedals 104, and a friction resistance system 105. The pivoting guide arms 102, the angled strut 103, a support strut 111, and/or a roller strut 112 can connect to form one or more articulating frames 106A-B. The combination of the angled strut 103, the support strut 111, and the roller strut 112 can generally form the shape of a triangle. The lateral motion system 100 can include a first articulating frame 106A and a second articulating frame 106B at opposite sides of the core 101. The lateral motion system 100 can be symmetrical about the core 101. The core 101 can include two or more angled struts 103.

The articulating frames 106A-B can include pivoting joints 121 and elbow connections 122. The pivoting joints 121 can facilitate connecting the pivoting guide arms 102 to the articulating frames 106A-B. The pivoting guide arms 102 can rotate about the pivoting joints 121. For example, as the user pushes away from the center, the pivoting guide arms 102 can rotate about the pivoting joints 121. The elbow connections 122 can enable folding the roller strut 112 towards the support struts 111. Folding the roller struts 112 towards the support struts 111 can reduce the size of the lateral motion system 100 for easy storage.

The pivoting guide arms 102 can include foot pedals 104. The foot pedals 104 can accept the feet of a user. The pivoting guide arms 102, the foot pedals 104, and the articulating frames 106A-B can support the weight of a user. The components of the lateral motion system 100 can be manufactured from aluminum, steel, carbon steel, carbon fiber, iron, a polymer, a composite material, and/or any particular material that can support the weight of the user. Users can step onto the lateral motion system 100 by securing their feet to the foot pedals 104. The user can push from the core 101 towards the distal end of the roller struts 112. As the user pushes from the core 101 laterally, the pivoting guide arm 102 moves away from the core 101. The motion can be repeated by both legs of the user to mimic the motion of skating on ice.

The lateral motion system 100 can include a center bumper limit 131 and an outer bumper limit 132. The outer bumper limit 132 and the center bumper limit 131 can limit the range of motion of the pivoting guide arms 102 during use. For example, when a user pushes the pivoting guide arm 102 outwards from the core 101, the foot pedals 104 can make contact with the outer bumper limit 132. Continuing this example, the foot pedals 104 can make contact with the outer bumper limits 132 and thus cannot exceed past that particular point. The user can perform a medial motion by retracting their leg back towards the core 101 and the center bumper limit 131. The foot pedal 104 can make contact with the center bumper limit 131, keeping the pivoting guide arm 102 from exceeding the limits of the roller strut 112.

The lateral motion system 100 can include a friction resistance system 105. The friction resistance system 105 can change the difficulty of training for the lateral motion system 100. The friction resistance system 105 can include friction straps 141. The friction straps 141 can connect to the pivoting guide arms 102. The friction resistance system 105 can create and apply a variable resistance force on the pivoting guide arms 102. For example, as the user pushes the pivoting guide arms 102 away from the core 101, the friction resistance system 105 can induce the variable resistance force on the pivoting guide arms 102 through the friction straps 141. Continuing this example, the variable resistance force induced on the pivoting guide arms 102 can have a direction opposite to the movement of the pivoting guide arms 102 as the user pushes away from the core 101. The friction straps 141 can induce a return force on the pivoting guide arms 102 in the same direction of motion as the pivoting guide arms 102 move towards the core 101. The friction straps 141 can apply the variable resistance force on the pivoting guide arms 102 in the opposite direction of movement proportionally to the rate of lateral movement. For example, the faster and harder a user pushes the pivoting guide arms 102, the greater the friction strap 141 can induce the variable return force on the pivoting guide arms 102. The potential functionalities of the friction resistance system 105 are discussed in further detail herein.

The lateral motion system 100 can include a locking joint 123. The locking joint 123 can include one or more locking pin 401 (see FIG. 4) for securing the roller struts 112 to the core 101. The locking pin 401 can be removed such that the roller struts 112 can detach from the core 101. For example, the locking pin 401 can be removed such that the roller struts 112 fold during storage. The roller struts 112 can rotate about the locking pin 401. For example, a height adjustment system (see FIG. 6A) can adjust the height of the articulating frames 106A-B by rotating the roller struts 112 about the locking pin 401 and the support struts about the pivoting joints 121.

The lateral motion system 100 can include the first articulating frame 106A extending from a first side of the core 101. The lateral motion system 100 can include the second articulating frame 106B extending from a second side of the core 101. For example, the lateral motion system 100 can be symmetrical about the core 101 and a central axis 811 (See FIG. 8). Though discussed as having the support strut 111, the lateral motion system 100 can function without the support strut 111. For example, the roller strut 112 can support the pivoting guide arms 102 as the pivoting guide arm 102 moves laterally along the roller strut 112. Continuing this example, during a folding procedure, the roller strut 112 can rotate about the locking joint 123 inwards towards the core 101. The locking joint 123 can function substantially similar to the pivoting joint 121.

Figure 2:
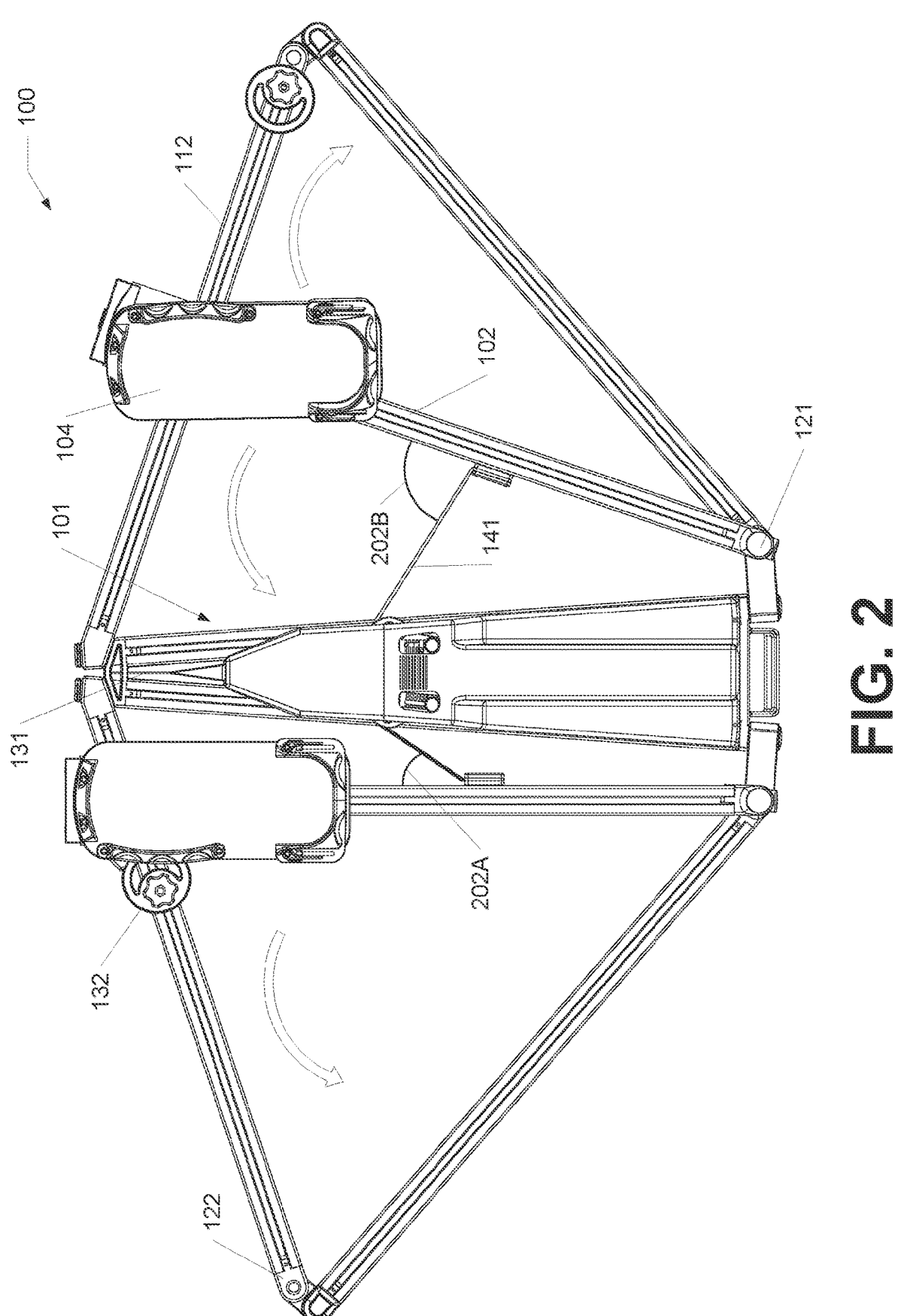
FIG. 2 illustrates a top-side view of the lateral motion system, according to one example of the disclosed technology.

Referring now to FIG. 2, illustrated is a top view of the lateral motion system 100, according to one example of the disclosed technology. The lateral motion system 100 can function such that the pivoting guide arms 102 can move away from the core 101 and/or towards the core 101 around the pivoting joint 121. For example, a user can secure a first foot and a second foot onto each of the foot pedals 104 using a strap (not shown), a shoe clip (not shown), and/or any particular system for securing the feet of the user to the foot pedals 104. Continuing this example, the user can push the foot pedals 104 away from the core 101 and towards the elbow connection 122. The pivoting guide arm 102 can make contact with the outer bumper limit 132. The outer bumper limit 132 can reduce the range of motion of the pivoting guide arm 102. The outer bumper limit 132 can be repositioned along the roller strut 112 to vary the range of motion of the pivoting guide arm 102. On reaching the outer bumper limit 132, the user can return the pivoting guide arm 102 towards the core 101. The outer bumper limit 132 can be manufactured from rubber, hard plastic, polymers, composite materials, and/or any particular resilient material used to limit the range of motion of the pivoting guide arms 102. The outer bumper limit 132 can include a bumper aperture in the center such that the rubber of the outer bumper limit 132 can fold inwards and return to its original shape. The outer bumper limit 132 can fold inwards into the bumper aperture such that the outer bumper limit 132 can absorb the impact of the pivoting guide arm 102 and return to its original shape during impact. As the user moves the pivoting guide arm 102 along the roller struts 112, the pivoting guide arm 102 can pivot about the pivoting joint 121 and perform a substantially oscillating motion.

The foot pedals 104 can be positioned at any particular location of the pivoting guide arm 102. For example, the foot pedals 104 can include a locking mechanism (not shown) that allows the foot pedals 104 to lock onto any particular location of the pivoting guide arms 102. Though, in one example, the foot pedals 104 can be positioned at the end of the pivoting guide arms 102, the foot pedals 104 can be placed at any particular location on the pivoting guide arms 102 nearest to the pivoting joints 121.

The pivoting guide arm 102 and the friction strap 141 can form an angle 202A-B. The angle 202A-B can influence the force exerted onto the pivoting guide arm 102. For example, when the pivoting guide arm 102 is proximal to the core 101, the friction strap 141 can form a first angle 202A between the pivoting guide arm 102 and the friction strap 141. The first angle 202A can be less than 90 degrees (e.g., an acute angle). Due to the first angle 202A between the friction strap 141 and the pivoting guide arm 102 being less than 90 degrees, a first component of the resistive force induced by the friction strap 141 onto the pivoting guide arm 102 is not along the path of rotation of the pivoting guide arm 102. The pivoting guide arm 102 can experience less resistive force along the path of rotation of the pivoting guide arm 102 when the pivoting guide arm 102 is proximal to the core 101. As the pivoting guide arm reaches the elbow connection 122, a second angle 202B can form. The second angle 202B can reach approximately 90 degrees (e.g., the friction strap 141 is perpendicular to the pivoting guide arm 102). The second angle 202B can function to increase the resistive force on the pivoting guide arm 102 along the path of rotation of the pivoting guide arm 102. By increasing the resistive force on the pivoting guide arm 102 along the path of rotation of the pivoting guide arm 102, the user experiences a greater variable resistance force when the pivoting guide arm 102 is extended towards the elbow connection 122.

The angle 202A-B shown are for example only, and one will understand that any angle resulting from the foot pedals 104 being pushed all the way to the end of the roller strut 112 and brought all the way back towards the core 101 are possible. For example, the angle 202A-B can be at least 0 degrees, 0-180 degrees, 0-90 degrees, 90-180 degrees, or less than 180 degrees.

Figure 3:
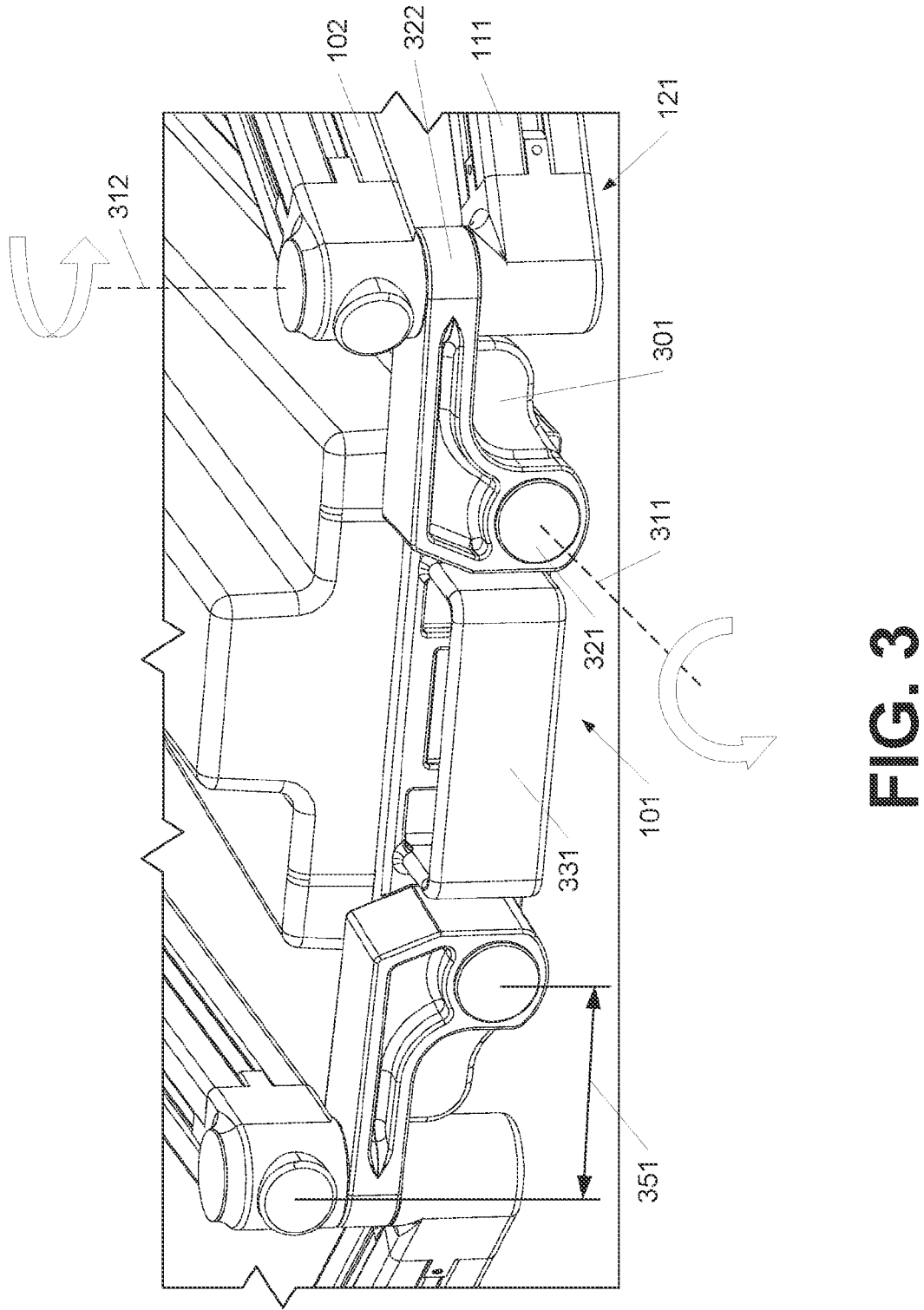
FIG. 3 illustrates a perspective view of a rear portion of the lateral motion system, according to one example of the disclosed technology.

Referring now to FIG. 3, illustrated is a perspective view of a rear portion of the lateral motion system 100, according to one example of the disclosed technology. The lateral motion system 100 can include a handle 331 for carrying.

The lateral motion system can include two or more pivoting joints 121 to support the articulating frames 106A-B of the lateral motion system 100. The pivoting joints 121 can include an outrigger 301. The outrigger 301 can generate greater clearance such that the pivoting guide arm 102 and the support strut 111 can connect to the core 101 while maintaining proper distance to adequately rotate.

The outrigger 301 can rotationally couple to the core at a first end 321. The outrigger 301 can rotationally couple to the pivoting guide arm 102 and the support strut 111 at a second end 322. The outrigger 301 can pivot about a horizontal axis 311. By rotating about the horizontal axis 311, the outrigger 301 can elevate the elbow connection 122 above the core 101. The pivoting guide arm 102 and the support strut 111 can pivot about a vertical axis 312. The pivoting guide arm 102 can facilitate lateral motions by pivoting about the second end 322 of the outrigger 301. The support strut 111 can perform a folding procedure by pivoting about the vertical axis 312 (e.g., the second end 322 of the outrigger 310). The outrigger 301 can include a length 351. The length 351 can extend from the first end 321 to the second end 322. The length 351 can measure any length as will be appropriate for use of the system.

Figure 4:
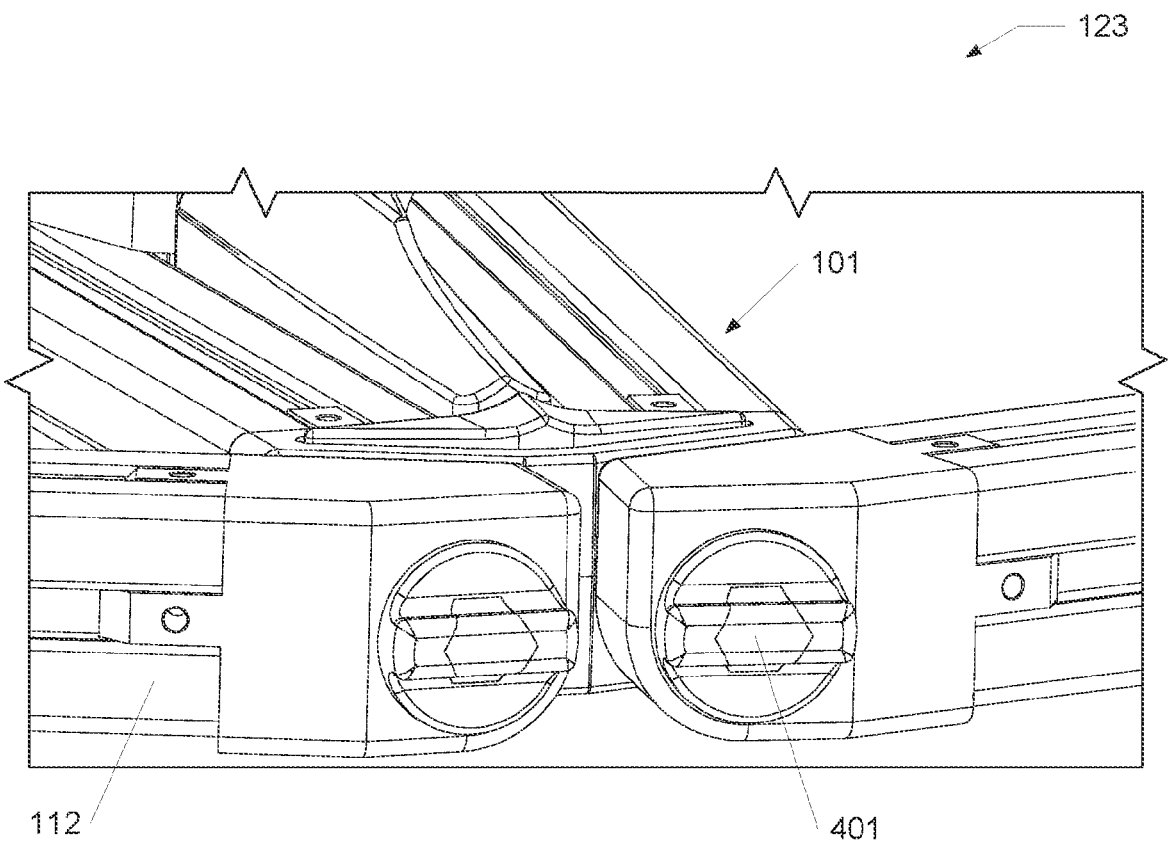
FIG. 4 illustrates a perspective view of a locking joint, according to one example of the disclosed technology.

Referring now to FIG. 4, illustrated is a perspective view of the locking joint 123, according to one example of the disclosed technology. The locking joint 123 can secure the roller strut 112 to the core 101. The locking joint 123 can include a removable locking pin 401. The removable locking pin 401 can secure the roller strut 112 to the core 101. For example, the removable locking pin 401 can include a screw or other removable fastening means. Continuing this example, the removable locking pin 401 can be unscrewed from the locking joint 123. Further continuing this example, by unscrewing the removable locking pin 401, the roller strut 112 can release from the locking joint 123 and can be in an unlocked position. In another example, the removable locking pin 401 can screw into the roller strut 112 and the locking joint 123 placing the roller strut 112 in a locked position. Though described as a screw, the removable locking pin 401 can include any type of pin system that can fix the roller strut 112 to the locking joint 123 while also being removable to release the roller strut from the locking joint 123. For example, the removable locking pin 401 can include a key and lock system, a rigid pin, a geometric locking pin, and/or any other particular pin system.

Figure 5A:
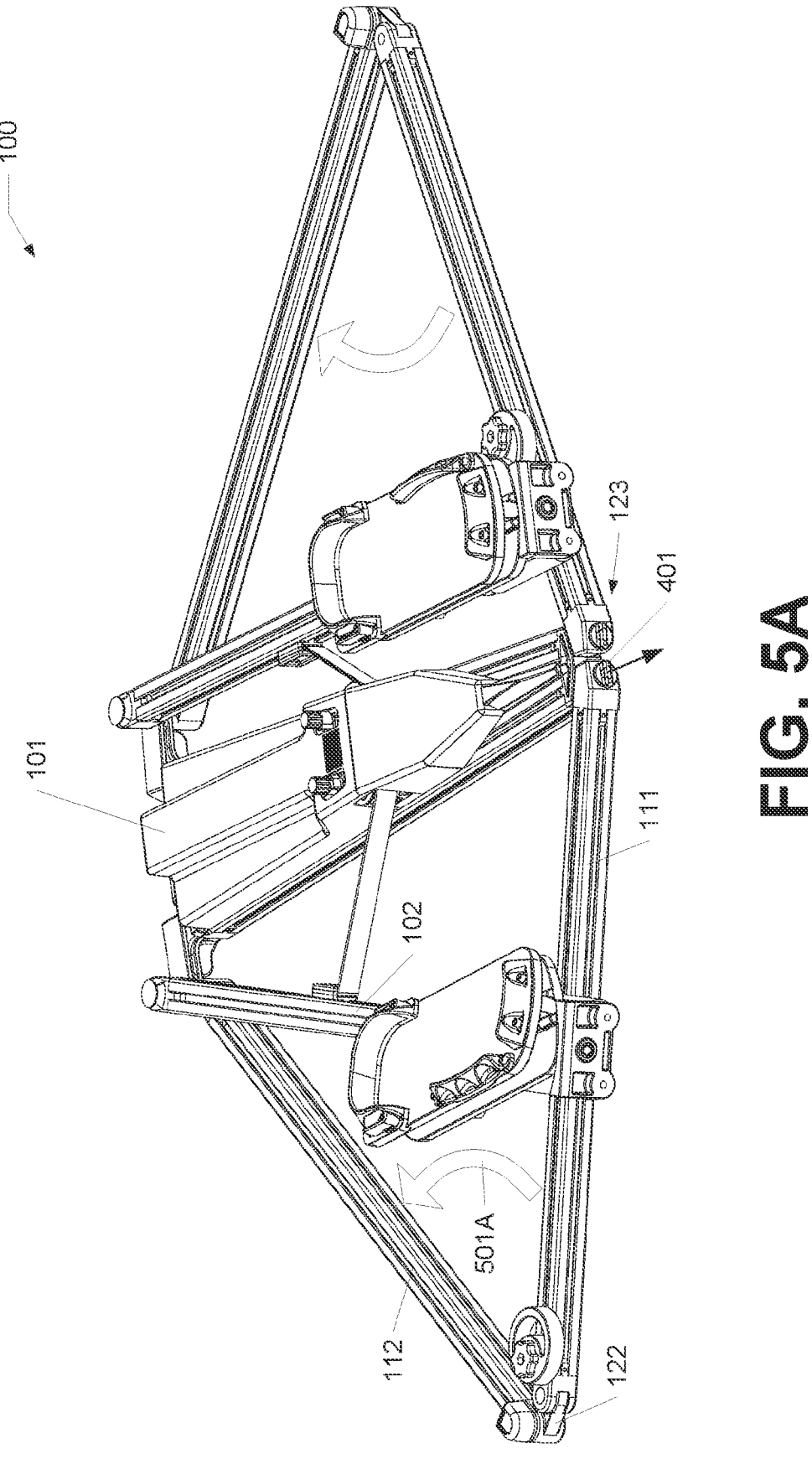
FIG. 5A illustrates a first position of the lateral motion system, according to one example of the disclosed technology.

Referring now to FIG. 5A, illustrated is a first position of the lateral motion system 100, according to one example of the disclosed technology. In the first position, the removable locking pin 401 is secured to the locking joint 123 and in the locked position. In the locked position, the pivoting guide arm 102 can move freely along the roller strut 112.

To commence a first phase of a folding procedure, the removable locking pin 401 can be removed from the locking joint 123. For example, the removable locking pin 401 can unscrew from the locking joint 123, releasing the roller strut 112 and placing the roller strut 112 in an unlocked position. Once in the unlocked position, the roller strut 112 can freely pivot about the elbow connection 122. The roller strut 112 can fold in a first inward direction 501A. For example, the roller strut 112 can rotate about the elbow connection 122 such that the roller strut 112 and the support strut 111 are touching (See FIG. 5B).

Figure 5B:
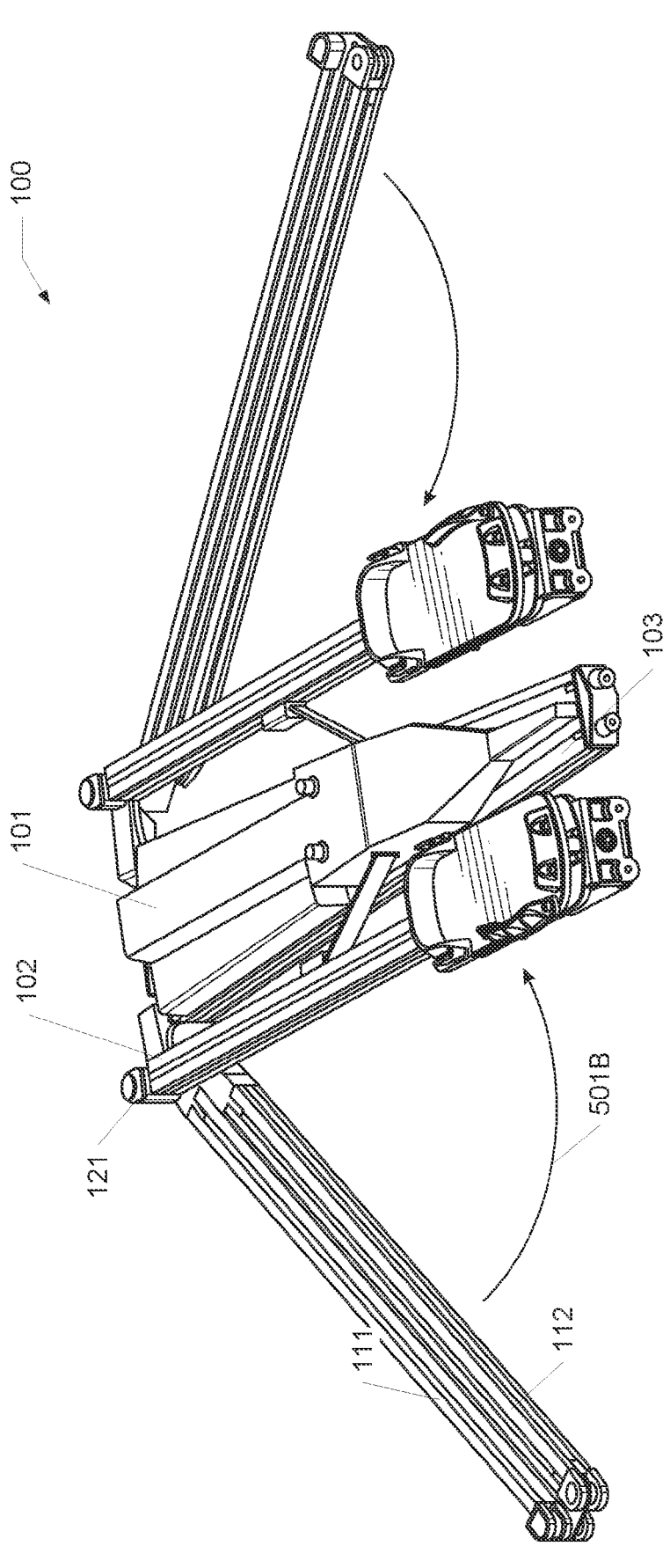
FIG. 5B illustrates a second position of the lateral motion system, according to one example of the disclosed technology.

Referring now to FIG. 5B, illustrated is a second position of the lateral motion system 100, according to one example of the disclosed technology. The second position of the lateral motion system 100 can illustrate a second phase of the folding procedure. During the second phase of the folding procedure, the pivoting guide arms 102 can pivot about the pivoting joint 121 towards the core 101. Once the roller strut 112 and the support strut 111 are touching, the support strut 111 can pivot about the pivoting joint 121. By pivoting about the pivoting joint 121 towards the core 101, both the roller strut 112 and the support strut 111 move along a second inwards direction 501B towards the core 101. The support strut 111 can fully rotate about the pivoting joint 121 such that the roller strut 112 can make contact with the angled strut 103.

Figure 5C:
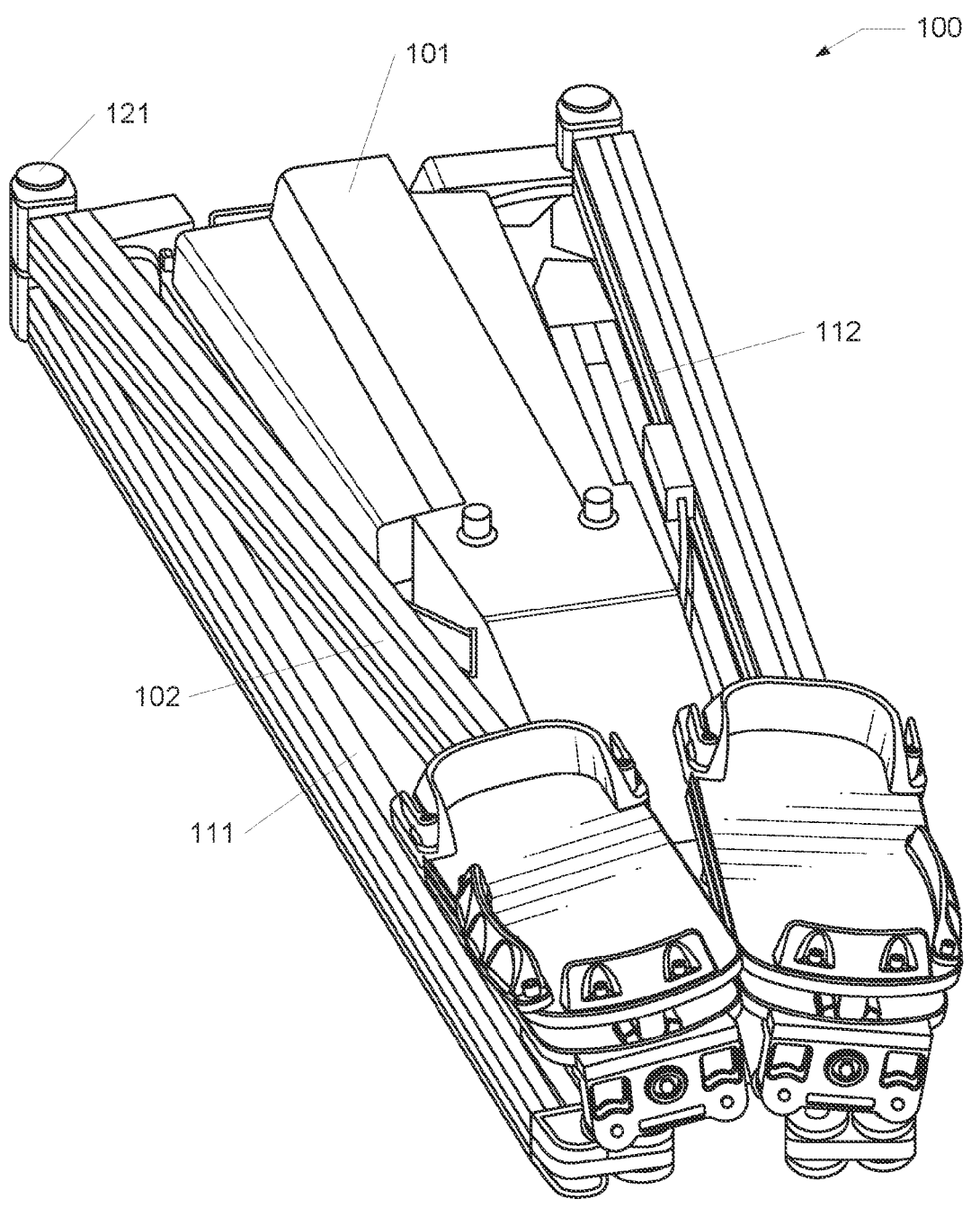
FIG. 5C illustrates a third position of the lateral motion system, according to one example of the disclosed technology.

Referring now to FIG. 5C, illustrated is a third position of the lateral motion system 100, according to one example of the disclosed technology. The third position of the lateral motion system 100 can illustrate a third phase of the folding procedure. In the third phase of the folding procedure, the support strut 111 can fully rotate about the pivoting joint 121 such that the roller strut 112 can make contact with the core 101. In the third position, the lateral motion system 100 can reduce its footprint in a particular space for increased ease of storage and transportation.

In the third position, the elbow connections 122 can include an aperture (not pictured) for connecting to the locking joint 123. For example, the locking pin 401 can pass through the aperture of the elbow connections 122 and into locking joint 123 to lock the support strut 111 and the roller strut 112 in the third position.

Figure 6A:
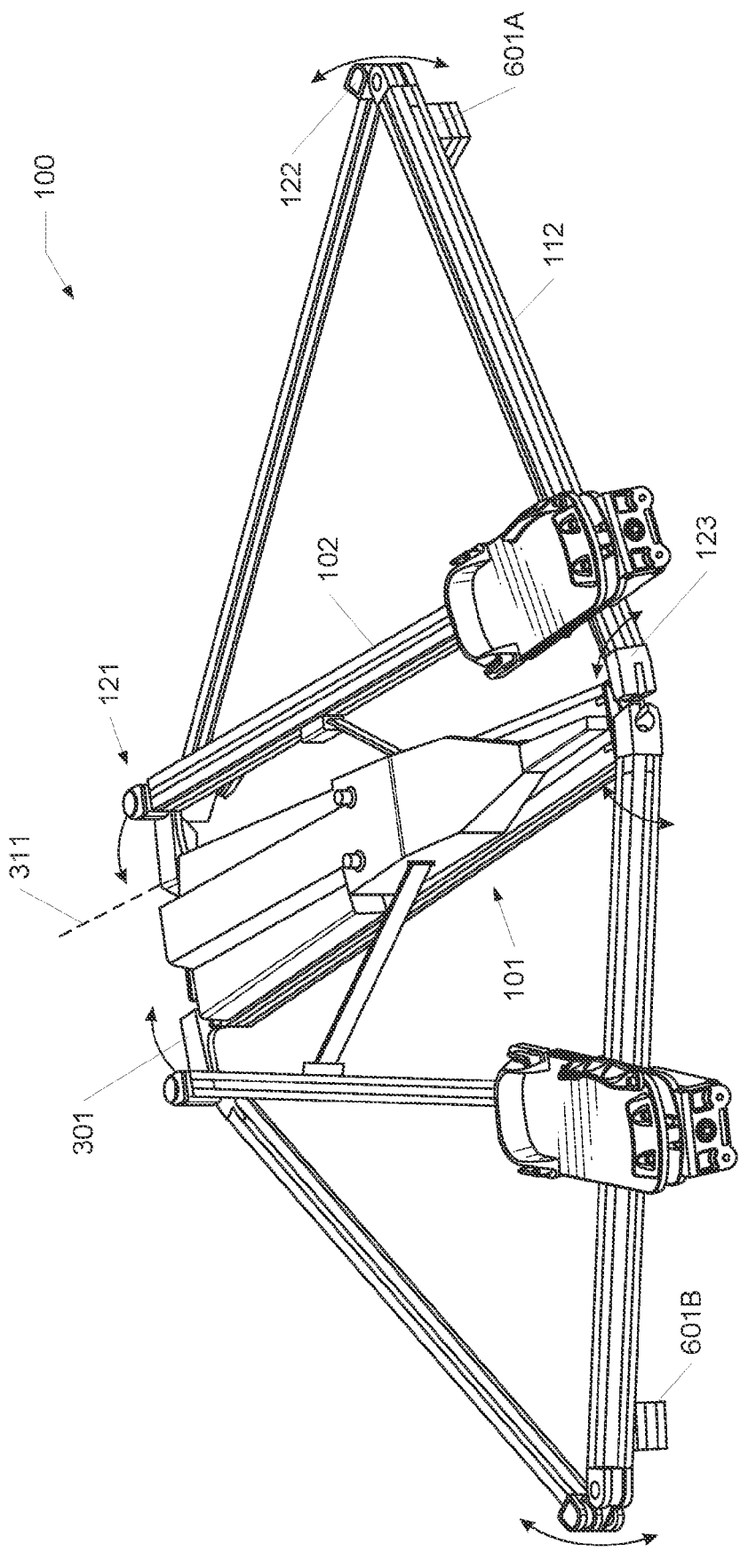
FIG. 6A illustrates a perspective view of the lateral motion system with lifted articulating frames, according to one example of the disclosed technology.

Referring now to FIG. 6A, illustrated is a perspective view of the lateral motion system 100 with lifted articulating frames 106A-B, according to one example of the disclosed technology. The elbow connections 122 can include a height adjustment system. The height adjustment system can elevate the elbow connections 122 to a point vertically above the core 101. By elevating the elbow connections 122 above the core 101, the pivoting guide arms 102 can move on an upwards incline as the pivoting guide arms 102 move away from the core 101. The user can feel a greater force as their legs push the pivoting guide arms 102 across the inclined roller struts 112 and away from the core 101. By increasing the incline of the roller struts 112, the user can be forced to use more effort pushing the pivoting guide arm up the roller struts 112.

In one example, the lateral motion system 100 can include rising blocks 601A-B that are placed under the elbow connections 122 to function as the height adjustment system. In another example, wedges, functioning as the rising blocks 601-B, can fold out from the base of the roller strut 112 to elevate the elbow connections 122. Continuing this example, the wedges can be folded back to a non-elevated position under the roller strut 112. In another example, an adjustable screw, functioning as the rising blocks 601-B, can extend from the elbow connections 122 that raises or lowers the elbow connections 122 to a position higher than the core 101. The height adjustment system can be any variable height adjustment tool for lifting the distal ends of the articulating frames 106A-B above the core 101. The height adjustment system can support the weight of a user during use. The elbow connection 122 can be raised above the core by rotating the roller strut about the locking joint 123 and rotating the outrigger 301 about the horizontal axis 311. Once the elbow connection 122 is above the core 101, the rising blocks 601A-B can be deployed. The elbow connection 122 can rest on the rising blocks 601A-B.

Figure 6B:
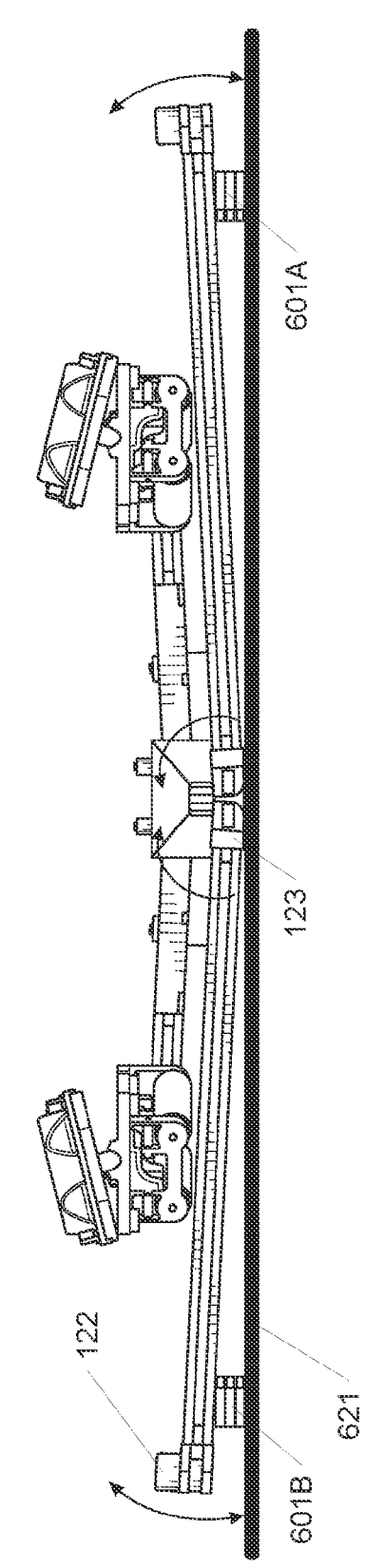
FIG. 6B illustrates a front view of the lateral motion system with lifted articulating frames, according to one example of the disclosed technology.

Referring now to FIG. 6B, illustrated is a front-view of the lateral motion system 100 with lifted articulating frames 106A-B, according to one example of the disclosed technology. The rising blocks 601A-B can be positioned on a ground 621 such that the elbow connections 122 are resting on the rising blocks 601A-B. The rising blocks 601A-B can include any particular height. The rising blocks 601A-B can be deployed remotely, electronically, or manually. For example, a computing system of the lateral motion system 100 can receive an input to deploy the rising blocks 601A-B. Continuing this example, the computing system of the lateral motion system 100 can deploy the rising blocks 601A-B in response to receiving the input to deploy the rising blocks 601A-B. The rising blocks 601A-B can be deployed through a mechanical release. For example, the mechanical release can include a spring loaded mechanism to deploy the rising blocks 601A-B. In another example, the elbow connection 122 can include a motor (not shown) such that the motor deploys a screw style rising block by rotating the screw out from the base of the elbow connection 122 towards the ground 621.

By rotating the articulating frames 106A-B about the locking joint 123 and the pivoting joint 121, the lateral motion system 100 can be placed on an unleveled area of the ground 621. For example, the rising blocks 601A-B can be deployed to level the lateral motion system 100 on an uneven surface. The lateral motion system 100 can include various gyroscopes to measure the evenness of the lateral motion system 100. When on an uneven surface the computing system can generate a warning based on the data gathered from the gyroscopes of the lateral motion system 100.

Figure 7:
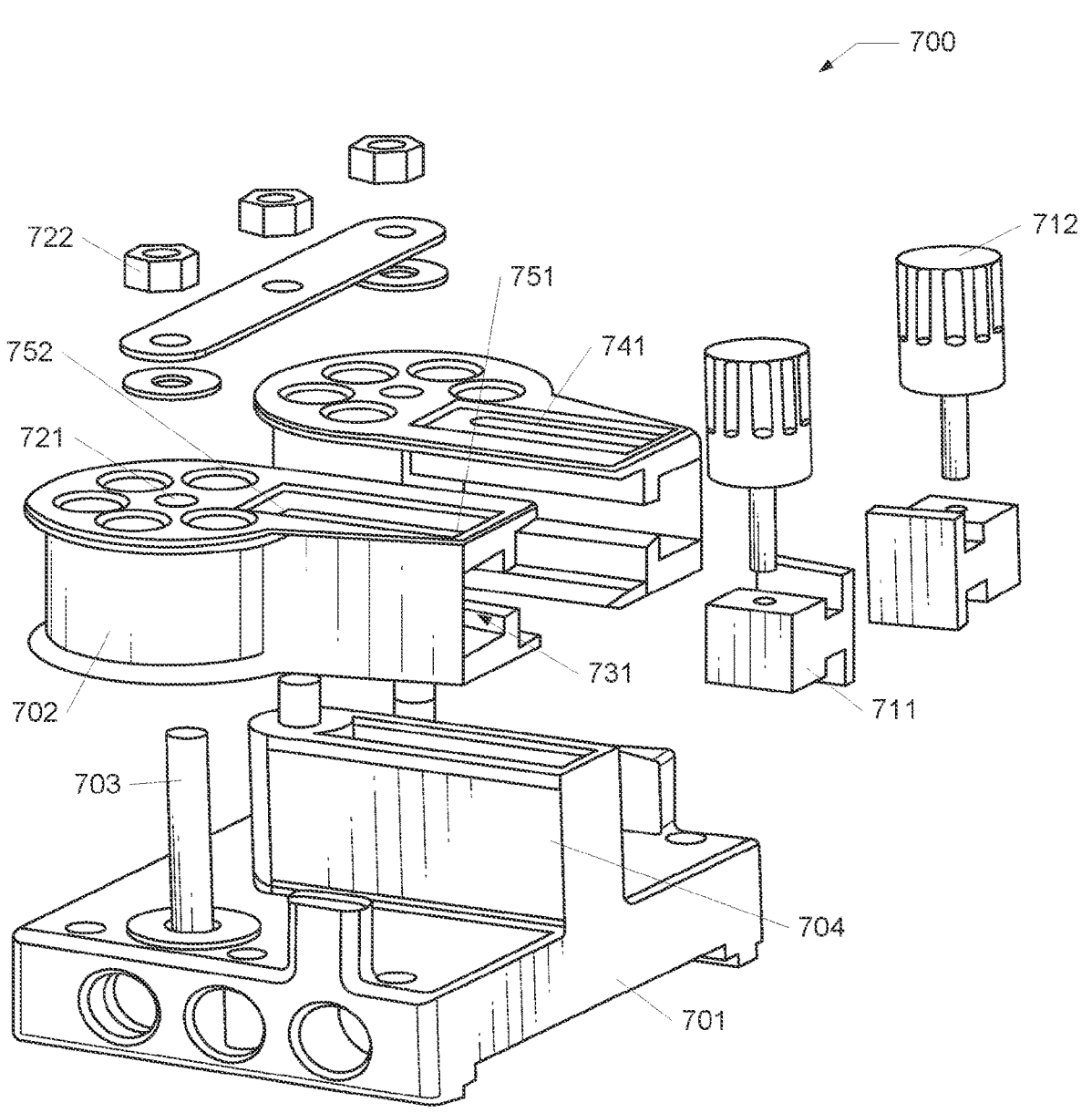
FIG. 7 illustrates an exploded view of the brake assembly, according to one example of the disclosed technology.

Referring now to FIG. 7, illustrated is an exploded view of a brake assembly 700, according to one example of the disclosed technology. The friction resistance system 105 can include the brake assembly 700 (see, e.g., FIG. 8). The brake assembly 700 can include a brake assembly base 701, a brake drum 702, a brake pin 703, a stationary brake pad 704, a variable brake pad 711, and a sliding adjustment knob 712. The brake assembly 700 can apply pressure onto the friction strap 141. The pressure applied by the brake assembly 700 to the friction strap 141 can create the variable resistance force on the pivoting guide arms 102 as they move away from the core 101.

The brake assembly base 701 can attach to the angled struts 103 of the core 101. The brake assembly base 701 can house all the components necessary for producing the variable resistance force on the friction straps 141. The brake assembly base 701 can be placed at various locations along the angled struts 103. Varying the location of the brake assembly base 701 can vary the variable resistance force produced on the pivoting guide arms 102. For example, the brake assembly base 701 can be placed at a location that increases the tension on an elastic shock cord 801 (see FIG. 8) and/or the friction straps 141. Increasing the tension on the friction straps 141 can increase the variable resistance force exerted on the pivoting guide arms 102 as they move away from the core 101.

The brake drum 702 can attach to the brake assembly base 701 through the brake pin 703. The brake drum 702 can include an attachment aperture 721. The brake drum 702 can be secured to the brake assembly base 701 by threading a nut 722 onto the brake pin 703 as the brake pin 703 extends through the attachment aperture 721. The brake pin 703 and the nut 722 can be replaced by a single material (e.g., rivet) that extends through the attachment aperture 721 and secures the brake drum 702 in place. The nut 722 can be replaced with any tool used to secure the brake drum 702 to the brake pin 703. The brake drum 702 can rotate about the brake pin 703. The brake drum 702 can include a channel that can accept the friction strap 141.

The brake drum 702 can accept the variable brake pad 711 and the sliding adjustment knob 712. The brake drum 702 can include a recessed portion 731. The recessed portion 731 can share a substantially similar shape to the variable brake pad 711. The variable brake pad 711 can slide into the recessed portion 731. The sliding adjustment knob 712 can extend through a connection port 741. The connection port 741 allows access to the recessed portion 731. For example, when the variable brake pad 711 is inserted into the recessed portion 731, the sliding adjustment knob 712 can extend through the connection port 741 and attach to the variable brake pad 711. The variable brake pad 711 can include a threaded aperture that can accept the sliding adjustment knob 712 for connection. The brake drum 702 can separate the sliding adjustment knob 712 and the variable brake pad 711. As the sliding adjustment knob is tightened by screwing further into the variable brake pad 711, the variable brake pad 711 can secure into a fixed location relative to the brake drum 702. The variable brake pad 711 can be moved and secured to various locations within the brake drum 702. Varying the location of the variable brake pad 711 can provide differing amounts of restriction forces on the friction straps 141. For example, when the variable brake pad 711 is secured to a proximal end 751 of the recessed portion 731, the brake drum 702 can generate the greatest compression on the friction strap 141. In another example, when the variable brake pad 711 is secured to a distal end 752 of the recessed portion 731, the brake drum 702 can generate the weakest compression on the friction strap 141.

The stationary brake pad 704 can provide additional braking capabilities on the friction straps 141. For example, the brake drum 702 and the variable brake pad 711 compress the friction straps 141 against the stationary brake pad 704. The clamping mechanism of the brake assembly 700 can provide additional forces on the pivoting guide arms 102 as they move away from the core 101. A further discussion of the potential functionalities of the brake assembly 700 can be found in FIG. 10.

The friction straps 141 (shown in other figures) can be manufactured from any particular material that induces adequate force to rotate the brake drum 702 about the brake pin 703. For example, the friction strap 141 can be manufactured from glass filled nylon. In another example, the friction strap 141 can be manufactured from rubber, high tension polyester filaments, nylon yarns, a composite material, natural materials (e.g., leather), and/or any other material that induces an adequate force to rotate the brake drum 702. The friction straps 141 can include a coefficient of friction of at least 0.230, 0.230-0.390, or less than 0.390. The brake assembly 700 can be manufactured from steel, stainless steel, polymers, composite materials, and/or any particular material that induces an adequate force to rotate the brake drum 702 about the brake pin 703.

The brake drum 702 can include any particular shape. For example, the brake drum can be round, eccentric, oval, elliptical, hexagonal, snail shaped, and/or any particular shape. The brake drum 702 can induce a force on the friction strap 141 with other components. For example, the brake drum 702 can include an internal spring mechanism that engages once the brake drum 702 has rotated about the brake pin 703 a particular amount. In another example, the brake drum can include a motor that electronically varies, in real time, the rotation of the brake drum 702 relative to the brake pin 703 to induce the variable resistance force on the friction strap 141.

The brake assembly 700 can include one or more sensors to track metrics associated with the brake assembly 700. For example, the brake assembly 700 can include various force sensors to measure the amount of work performed by the user during a particular workout. In another example, the brake assembly 700 can include various maintenance sensors for tracking the current health and status of the lateral motion system 100.

Figure 8:
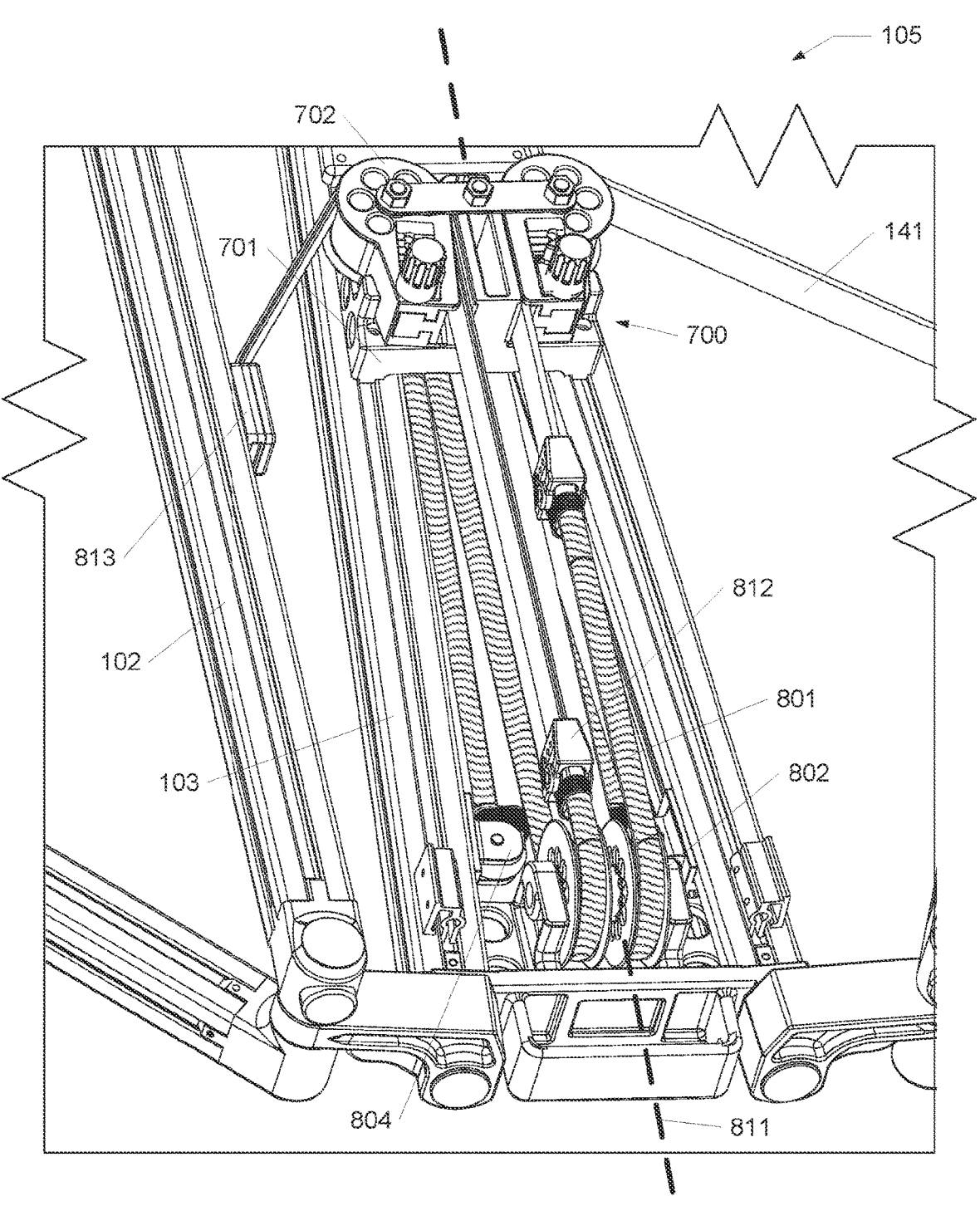
FIG. 8 illustrates a perspective view of a friction resistance system, according to one example of the disclosed technology.

Referring now to FIG. 8, illustrated is a perspective view of the friction resistance system 105, according to one example of the disclosed technology. The friction resistance system 105 can include a cover (See FIG. 1). The friction resistance system 105 can include elastic shock cords 801, horizontal pulleys 1101 (see FIG. 11 for further details and illustrations), a first connection point 813, a second connection point 812, base connectors 804, friction straps 141, vertical pulleys 802 and the brake assembly 700. The first connection point 813 can demarcate the location where a first end of the friction strap 141 connects to the pivoting guide arms 102. The second connection point 812 can demarcate the location where a second end of the friction strap 141 connects to the elastic shock cords 801. The first connection point 813 and the second connection point 812 can connect to the friction strap 141 via an adhesive, bolts, a stitching, clamps, or any other affixation means. The lateral motion system 100 can be symmetrical about a central axis 811. For example, the lateral motion system 100 can include the friction strap 141, the pivoting guide arm 102, the first articulating frame 106A, the brake drum 702, the stationary brake pad 704, the variable brake pad 711, the sliding adjustable knob 712, and other components for the left leg of the user. Continuing this example, the lateral motion system 100 includes a second set of the same components discussed herein for the right leg of the user.

The friction straps 141 can be manufactured from nylon reinforced leather material. The friction straps 141 can be manufactured from any particular material that provides adequate friction between the brake drum 702, the friction straps 141, the variable brake pad 711, and the stationary brake pad 704. The friction straps 141 can connect to the pivoting guide arms 102 at the first connection point 813 and to the elastic shock cords 801 at the second connection point 812. The second connection point 812 can include a strap connector that can fix the friction strap 141 to the elastic shock cord 801. The friction straps 141 can wrap around the brake drum 702 and between the variable brake pad 711 and the stationary brake pad 704. The elastic shock cord 801 can connect to the angled strut 103 at the base connector 804. The base connector 804 can function as a fixing device to fix the elastic shock cord 801 to the core 101.

The vertical pulleys 802 can function to reduce the space necessary to store the elastic shock cord 801 in the friction resistance system 105. For example, the elastic shock cords 801 can wind around the vertical pulleys 802 such that the elastic shock cords 801 can be redirected within the friction resistance system 105 and confined within the friction resistance system 105.

The friction straps 141 can induce a force on the pivoting guide arms 102 in the opposite direction of motion. For example, as the user pushes the pivoting guide arm 102 away from the core 101, the friction strap 141 can follow the direction of movement. Continuing this example, the friction between the brake drum 702 and the friction strap 141 can induce a rotation on the brake drum 702. Continuing this example, the rotation of the brake drum 702 can instigate a compression of the friction strap 141 between the variable brake pad 711 and the stationary brake pad 704. Continuing this example, the compression of the friction strap 141 can apply a greater force onto the pivoting guide arm 102 as the user continues to push away from the core 101. Continuing this example, because the elastic shock cord 801 is fixed to the angled strut 103, the elastic shock cord 801 can begin to stretch relative to its resting position due to the movement of the friction strap 141. Continuing this example, the elastic shock cord 801 can exert a tensile force on the friction strap 141 in the opposite direction of motion of the pivoting guide arms 102, further inducing a restorative force on the pivoting guide arms 102. In another example, the friction straps 141 and the elastic shock cords 801 can be combined to form one continuous cord including one continuous material. Continuing this example, the combined friction straps and elastic shock cords 801 can include a material that includes elastic properties of the elastic shock cords 801 while also including resistance properties of the friction straps 141. In yet another example, the elastic shock cords 801 can be combined with the friction straps 141 to include a continuous multi-material cord. Continuing this example, the continuous multi-material cord can include a material for generating the frictional force with the brake drum 702 and a second material that can exhibit elastic properties similar to the elastic shock cords 801.

The intensity of the force exerted onto the pivoting guide arms 102 can be adjusted. For example, the sliding adjustable knob 712 can loosen the hold on the variable brake pad 711. Continuing this example, the user can move the variable brake pad 711 to other locations in the recessed portion 731 (e.g., the distal end 751 and/or the proximal end 752) of the brake drum 702. Continuing this example, the variable brake pad 711 can provide its greatest friction force on the friction straps 141 if located at the front of the recessed portion 731. By varying the location of the variable brake pad 711, the user can adjust the force intensity exerted on the pivoting guide arms 102.

Figure 9:
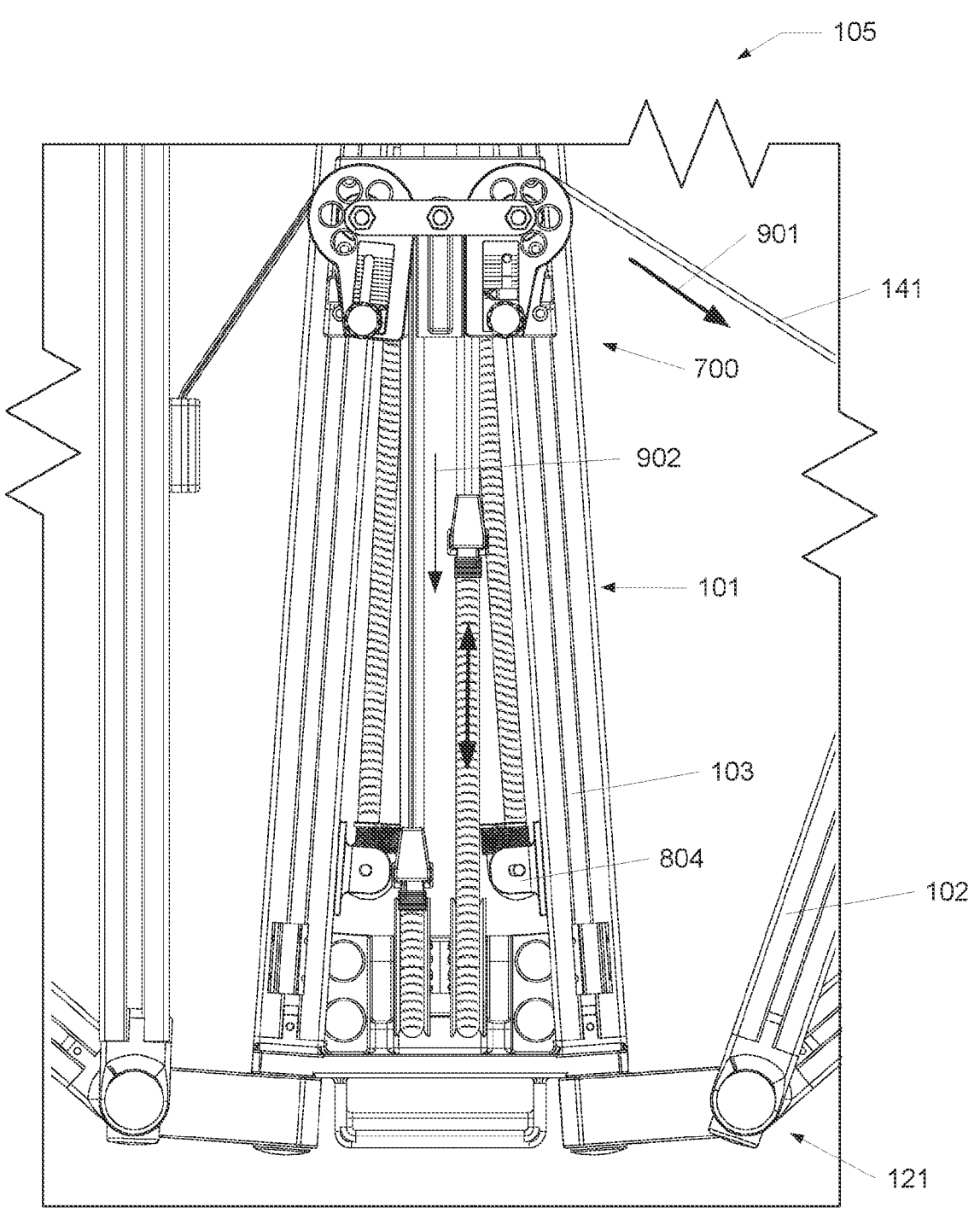
FIG. 9 illustrates a top-view of the friction resistance system, according to one example of the disclosed technology.

Referring now to FIG. 9, illustrated is a top view of the friction resistance system 105, according to one example of the disclosed technology. During use, the pivoting guide arm 102 can move laterally towards the elbow connection 122 (e.g., away from the core 101). As the pivoting guide arm 102 moves away from the core 101, the pivoting guide arm 102 can pull the friction strap 141 along a first direction 901. The friction strap 141 can pull on the elastic cord 801. By pulling on the elastic cord 801, the friction strap 141 can elongate the elastic cord 801. For example, the elastic cord 801 is elongated as the friction strap 141 moves in the first direction 901. As the pivoting guide arm 102 moves back towards the core 101, the elastic cord 801 retracts and generates a return force 902. The elastic cord 801 can apply the return force 902 into the pivoting guide arm 102 along the friction strap 141. For example, the elastic cord 801 can pull the pivoting guide arm 102 towards the core 101 through the friction strap 141.

In on example, the base connector 804 is connected to a motor. Continuing this example, the motor can generate the return force 902 onto the friction strap 141. The motor can vary the rate and magnitude of the return force 902 such that the user feels various levels of intensity during a training routine.

The base connector 804 can be moved along the angled struts 103. For example, the base connector 804 can be moved along the angled struts 103 and towards the pivoting joints 121 or towards the brake assembly 700. By moving the base connector 804 towards the brake assembly 700, the elongation of the elastic cord 801 can be reduced and the return force 902 generated on the pivoting guide arm 102 can be reduced. By moving the base connector 804 towards the pivoting joint 121, the elongation of the elastic cord 801 can be increased and the return force 902 generated on the pivoting guide arm 102 can be increased. The return force 902 can continually act on the pivoting guide arm 102. For example, the as the pivoting guide arm 102 moves away from the core 101, the return force 902 generated by the elastic cord 801 can increase in magnitude. Continuing this example, the user can perform greater work to counteract the return force 902 generated by the elastic cord 801.

Figure 10:
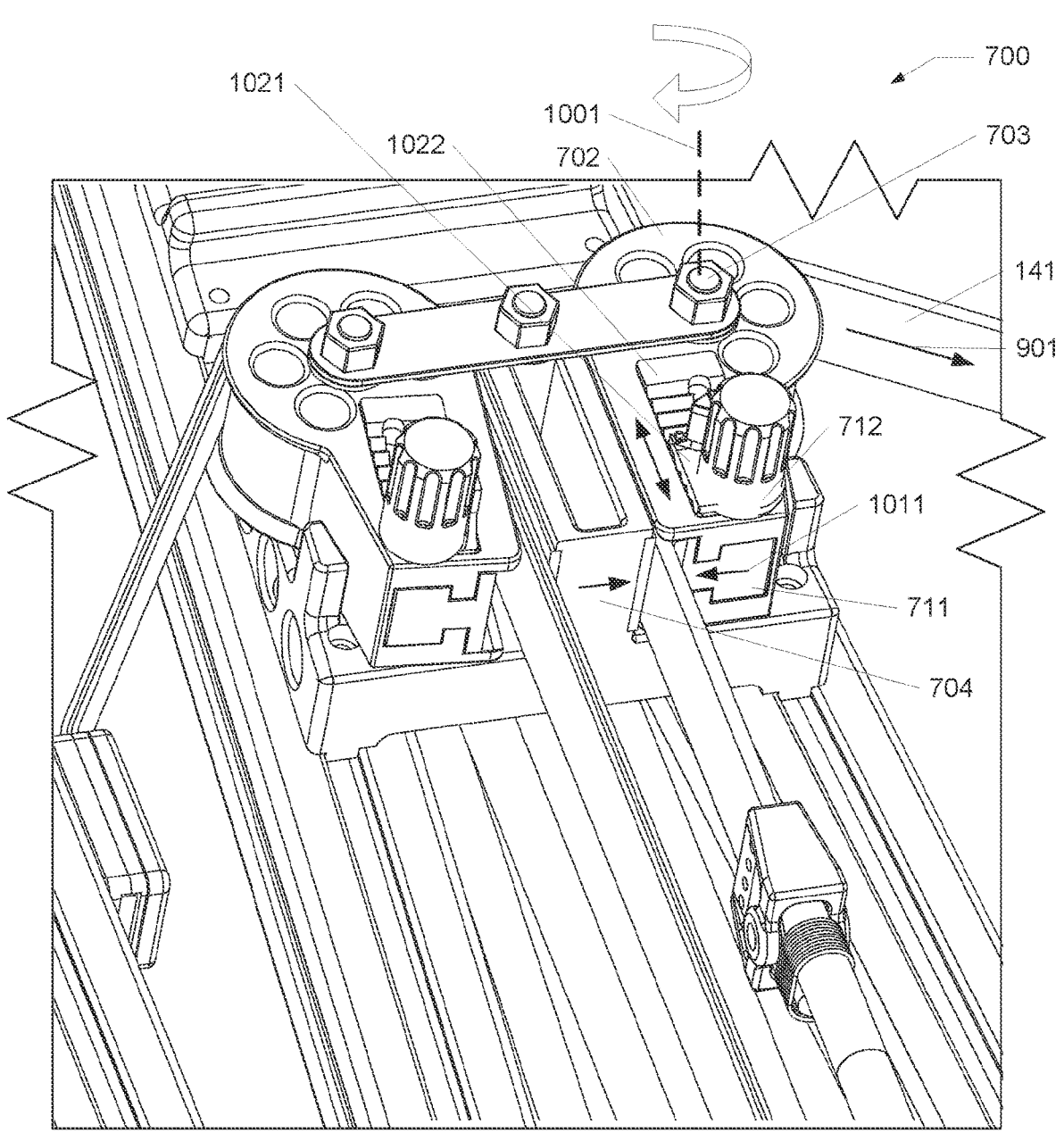
FIG. 10 illustrates an enhanced view of a brake assembly, according to one example of the disclosed technology.

Referring now to FIG. 10, illustrated is an enhanced view of the brake assembly 700, according to one example of the disclosed technology. The brake assembly 700 can induce the variable resistance force on the friction strap 141 and the pivoting guide arms 102. The variable resistance force induced on the friction strap 141 can increase the force exerted on the user during a particular workout. For example, the variable resistance force can increase as the user exerts more force to move the pivoting guide arms 102.

In an example scenario, the pivoting guide arm 102 can pull the friction strap 141 in the first direction 901. The friction strap 141 can wrap around the brake drum 702. At the location where the friction strap 141 makes contact with the brake drum 702, the friction strap 141 can generate a frictional force where the friction strap 141 makes contact with the brake drum 702. By inducing the frictional force against the brake drum 702, the brake drum can rotate about a brake axis 1001. The brake axis 1001 can be centered about the brake pin 703. As the friction strap 141 moves in the first direction 901, the friction strap 141 can induce a clockwise motion in the brake drum 702. The functionality of the brake assembly 700 can be symmetrical about the central axis 811. For example, the motions, movements, and forces induced can be equal and/or opposite for the components on either sides of the central axis 811.

As the brake drum 702 rotates about the brake axis 1001, the brake drum 702 can press the variable brake pad 711 into the friction strap 141 and into the stationary brake pad 704. For example, the brake drum 702 can compress the friction strap 141 in between the variable brake pad 711 and the stationary brake pad 704. By compressing the friction strap 141 between the variable brake pad 711 and the stationary brake pad 704, the brake drum 702 can induce the variable resistance force on the friction strap 141. The brake drum 702 can induce a compression force 1011 onto the friction strap 141 located in between the variable brake pad 711 and the stationary brake pad 704. The compression force 1011 can increase as the user pushes the pivoting guide arm 102 away from the core 101. For example, as the user increases an exertion force to move the pivoting guide arm 102, the friction strap 141 is compressed against the brake drum 702, causing the drum to rotate in the direction of movement of the strap, which in turn causes the brake pads 711 and 704 to compress against each other, thereby squeezing the strap 141 and causing the frictional force to increase. As the frictional force increases, the brake drum 702 can increase the compression force 1011 applied to the friction strap 141.

The location of the variable brake pad 711 within the brake drum 702 can be varied such that the variable resistance force increases or decreases. For example, the sliding adjustment knob 712 can include one or more teeth 1021. Continuing this example, the brake drum 702 can include one or more ridges 1022. The one or more teeth 1021 can couple with the one or more ridges 1022. By coupling the one or more teeth 1021 with the one or more ridges 1022, the sliding adjustment knob 712 can set the variable brake pad 711 at preset locations. The variable brake pad 711 can be placed at the distal end 751 of the recessed portion 731 to decrease the effect of the variable resistance force on the friction strap 141. The variable brake pad 711 can be placed at the proximal end 752 of the recessed portion 731 to increase the effect of the variable resistance force on the friction strap 141.

In one example, the friction strap 141 and the brake assembly 700 can apply a constant force on the pivoting guide arms 102. The brake drum 702 can engage and can apply a constant force when the pivoting guide arms 102 induce a constant tension into the friction strap 141. For example, the brake drum 702 can be set to a fixed position such that the brake drum 702 applies a constant force onto the friction straps 141. Continuing this example, the brake drum 702 and/or the friction strap 141 can be fixed using an adjustable clamp (e.g., a manually adjustable screw system attachable to the brake drum 702 and/or the friction strap 141) to set a constant friction force while the user is operating the lateral motion trainer 100.

Figure 11:
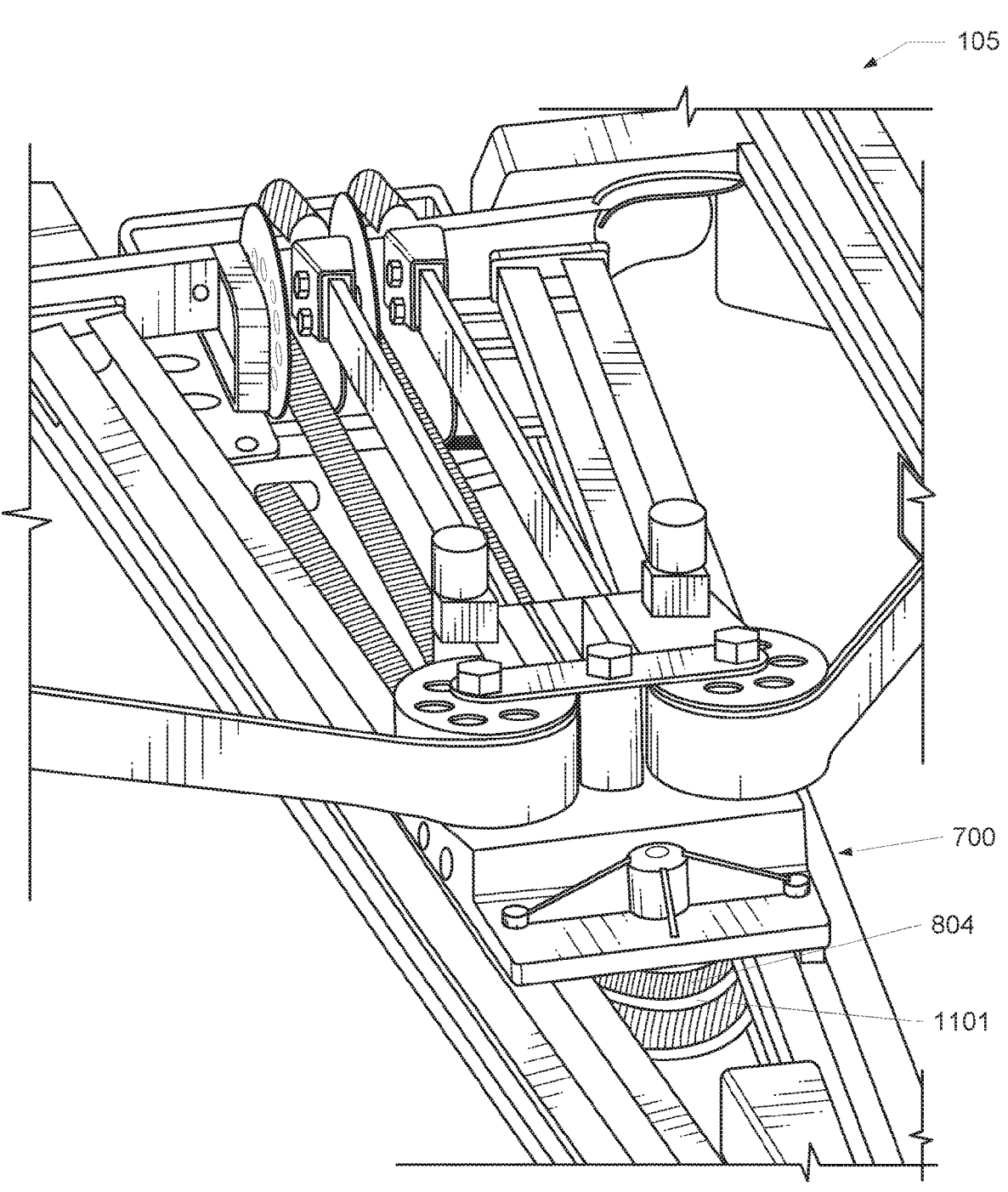
FIG. 11 illustrates a second perspective view of the friction resistance system, according to one example of the disclosed technology.

Referring now to FIG. 11, illustrated is a second perspective view of the friction resistance system 105, according to one example of the disclosed technology. The friction resistance system 105 can include one or more horizontal pulleys 1101. The horizontal pulleys 1101 can be located below the brake assembly 700. The elastic cord 801 can pass through the horizontal pulleys 1101. By passing the elastic cord 801 through the horizontal pulleys 1101, the elastic cord 801 can be stored within the friction resistance system 105. The horizontal pulleys 1101 can function substantially similarly to the vertical pulleys 702.

Figure 12:
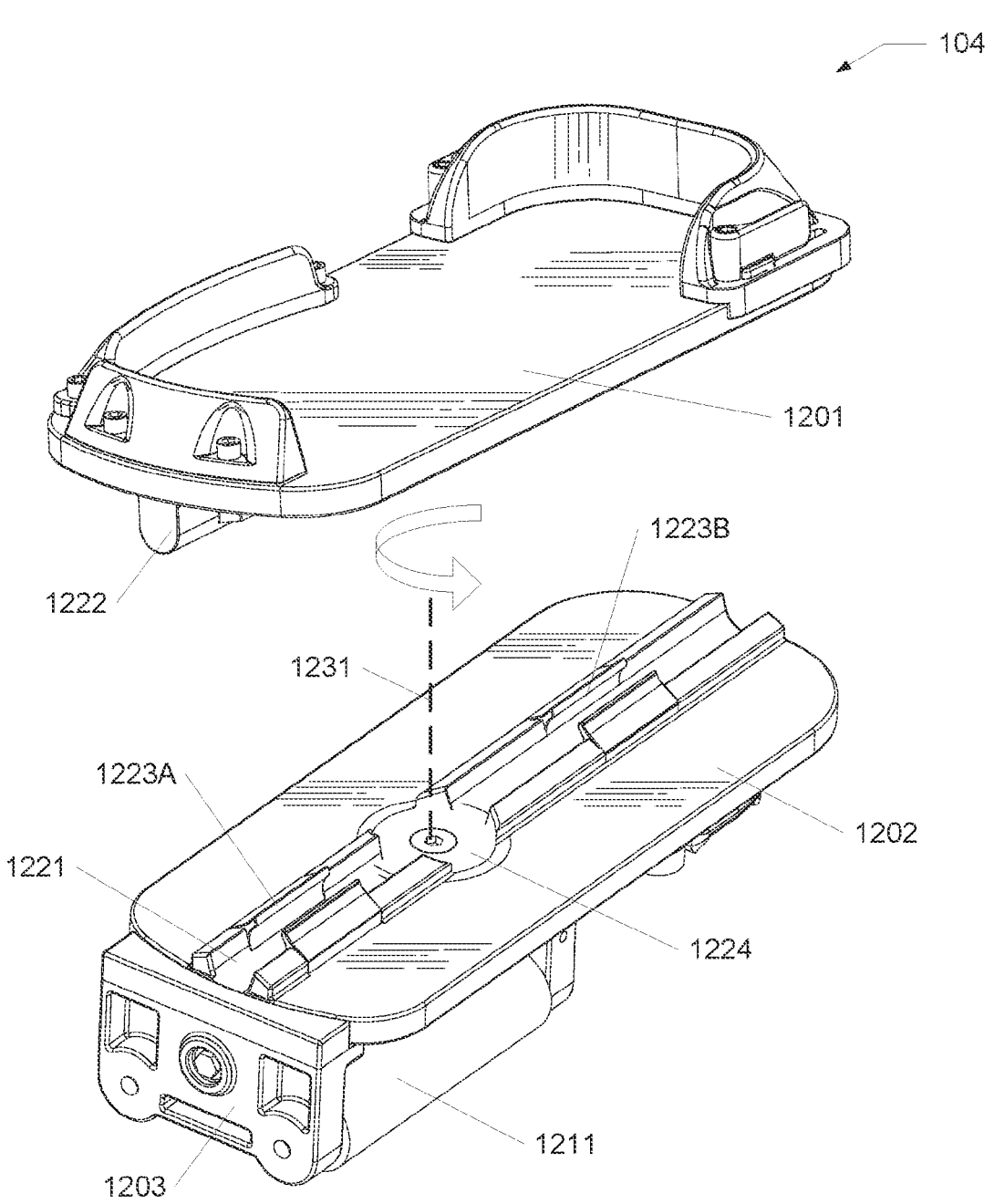
FIG. 12 illustrates an exploded view of a foot pedal, according to one example of the disclosed technology.

Referring now to FIG. 12, illustrated is an exploded view of the foot pedal 104, according to one example of the disclosed technology. The foot pedal 104 can include an adjustable footplate 1201, a foot pedal base 1202, and a movement mechanism 1203. The foot pedal 104 can function as a component of the pivoting guide arm 102 for receiving the foot of the user. The foot pedal 104 can be located on the pivoting guide arm 102 at a location opposite the pivoting joint 121.

The footplate 1201 can function as a location for receiving the foot of the user. For example, the user can step onto the footplate 1201. The footplate 1201 can include a footplate rib 1222. The footplate rib 1222 can extend the length of the footplate 1201 and along an underside of the footplate 1201. The foot pedal base 1202 can include a footplate channel 1221 and one or more footplate clips 1223A-B. The footplate channel 1221 can receive the footplate rib 1222. The footplate 1201 can rotationally couple to the foot pedal base 1202 through the footplate rib 1222 and the footplate channel 1221. The footplate rib 1222 can rotate within the footplate channel 1221. The footplate channel 1221 can employ the one or more footplate clips 1223A-B to secure the footplate channel 1221 to the footplate rib 1222.

The foot pedal base 1202 can attach to the movement mechanism 1203 through a rotational pin 1224. The rotational pin 1224 can secure the foot pedal base 1202 to the movement mechanism 1203 while allowing the foot pedal base 1202 rotate about the rotational pin 1224. For example, the foot pedal base 1202 can rotate about a central foot axis 1231. Rotating about the rotational pin 1224 can allow the user to perform adduction and abduction motions with their feet.

The movement mechanism 1203 can include one or more movement apparatuses 1211. The movement apparatus 1211 can include but is not limited to a roller ball bearing system, at least one rolling pin, at least one wheel, or any particular device that allows the movement mechanism 1203 to move along the roller strut 112. For example, the movement apparatus 1211 can include a ball bearing system to roll the foot pedal 104 along the roller strut 112. In another example, the foot pedal 104 can be detached from the pivoting guide arm 102 and secured to the roller strut 112. Continuing this example, the movement apparatus 1211 can include a ball bearing system embedded into the roller strut 112 such that the foot pedal 104 can roll along the roller strut 112 without the pivoting guide arm 102. In yet another example, the movement mechanism 1211 can include a low friction material such that the foot pedal 104 can glide along the roller strut 112 without inducing a noticeable friction force on the user. In yet another example, the movement apparatus 1211 can include wheels that roll along the roller strut 112. In yet another example, the movement apparatus 1211 can connect to a tethered system within the roller strut 112 such that the foot pedal 104 can glide along the roller strut 112 along the tethered system within the roller strut 112.

Figure 13:
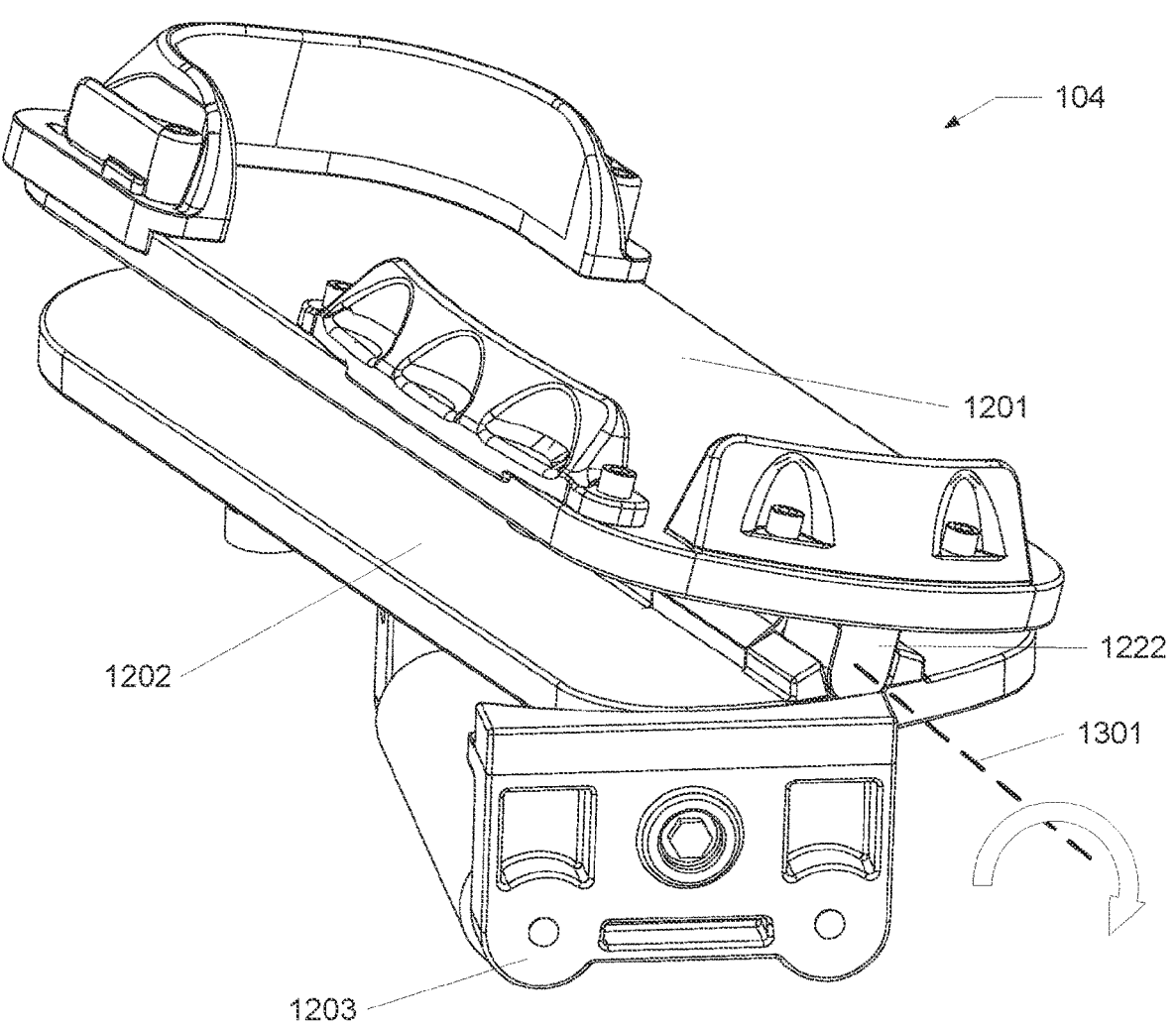
FIG. 13 illustrates a perspective view of the foot pedal, according to one example of the disclosed technology.

Referring now to FIG. 13, illustrated is a perspective view of the foot pedal 104, according to one example of the disclosed technology. The footplate 1201 can pivot about the footplate rib 1222. For example, the footplate 1201 can pivot about a footplate rib axis 1301. The footplate 1201 can rotate about the footplate rib axis 1301 such that a user can perform eversion and/or inversion motions. The foot pedal base 1202 can rotate about the movement mechanism 1203 such that the user can perform internal rotation and external rotation motions. The foot pedal base 1202 and the footplate 1201 can pivot about their respective positions simultaneously.

Figure 14:
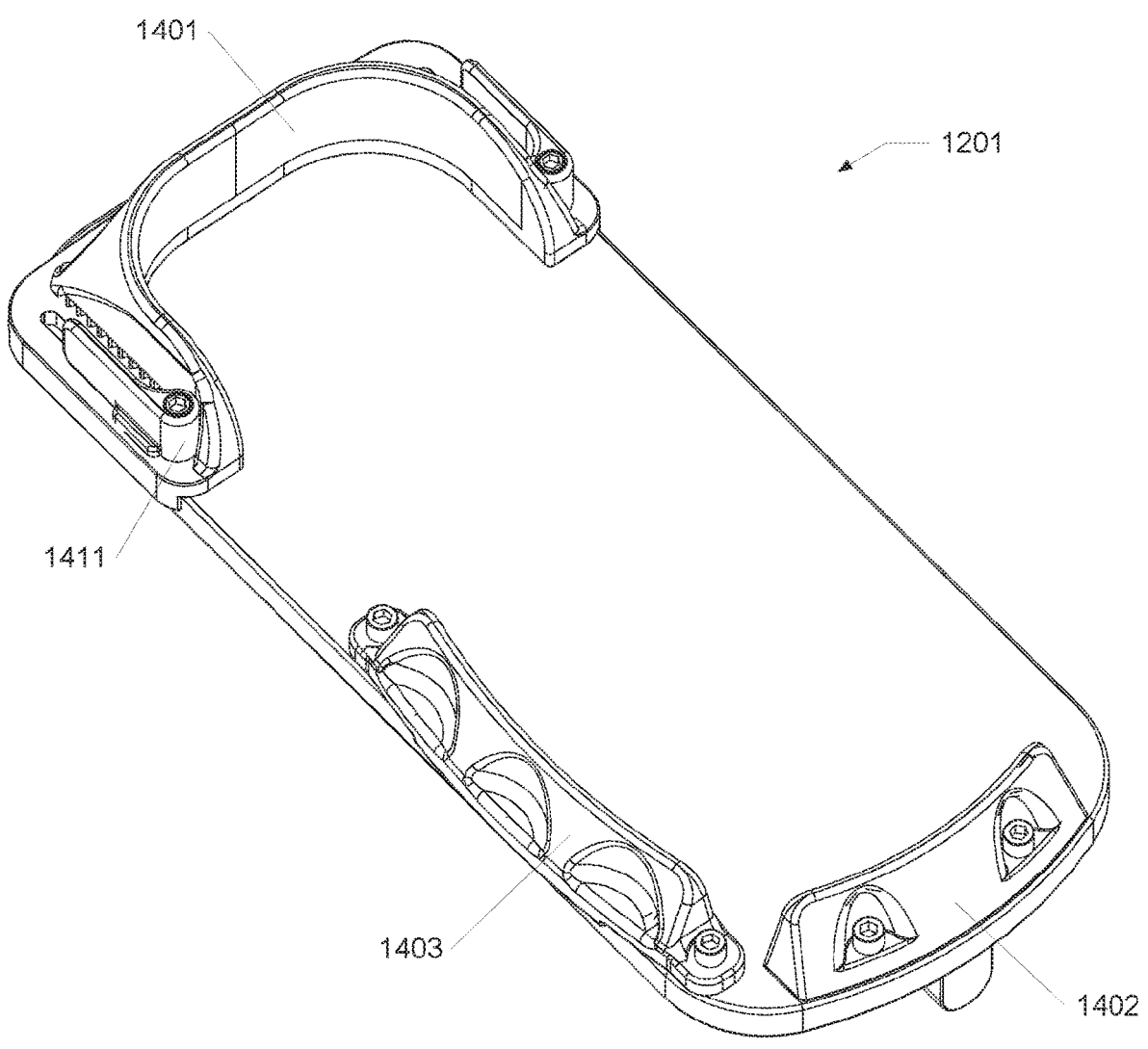
FIG. 14 illustrates a perspective view of a footplate, according to one example of the disclosed technology.

Referring now to FIG. 14, illustrated is a perspective view of the footplate 1201, according to one example of the disclosed technology. The footplate 1201 can include a heal block 1401, a toe block 1402, and a metatarsal block 1403. The heal block 1401 can include an adjustment knob 1411. The adjustment knob 1411 can secure the heal block 1401 to any particular position on the footplate 1201 to accommodate for varying feet sizes of the user. The heal block 1401, the toe block 1402, and the metatarsal block 1403 can secure the foot of the user of the footplate 1201.

Figure 15:
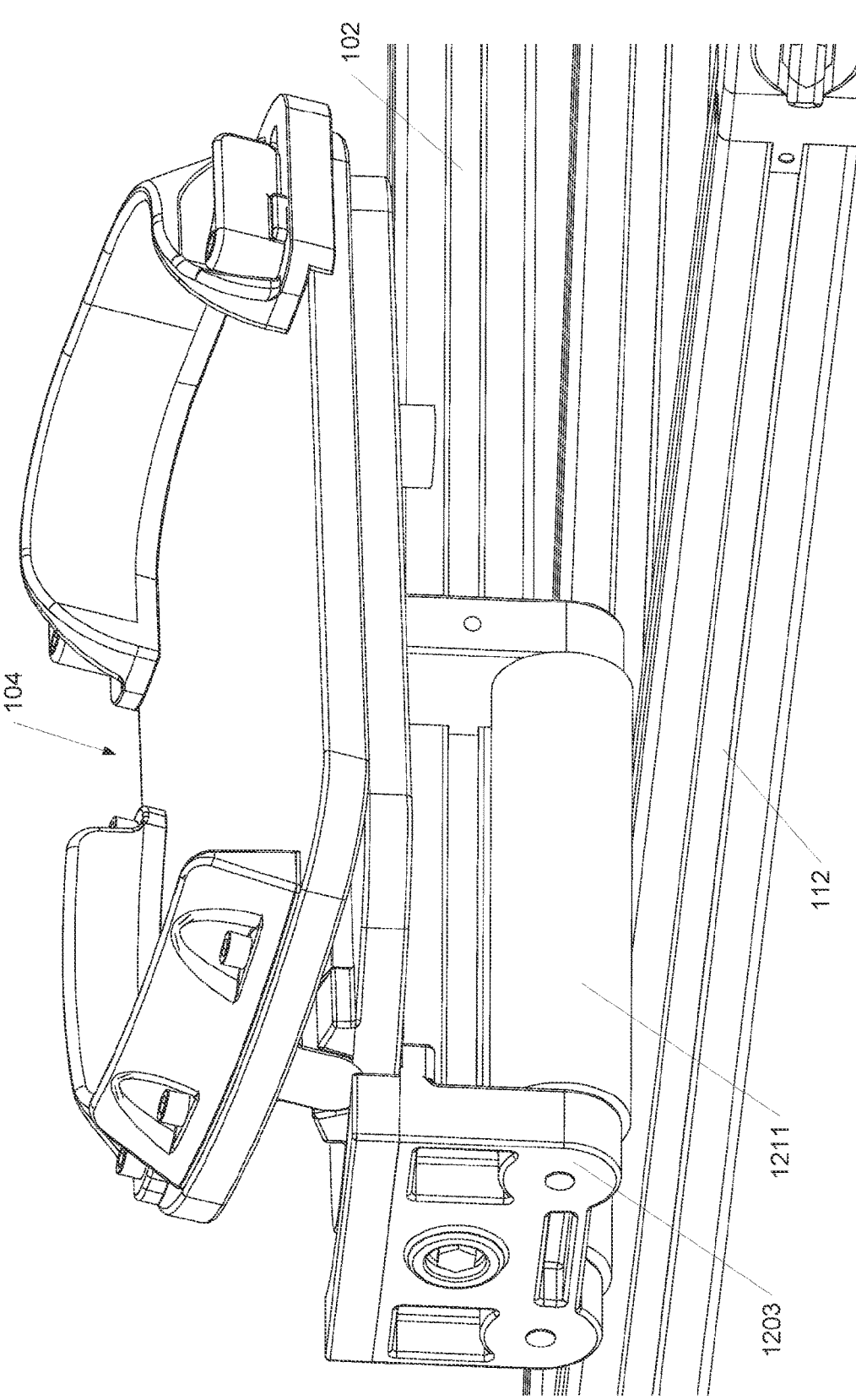
FIG. 15 illustrates a perspective view of the foot pedal on the articulating frame, according to one example of the disclosed technology.

Referring now to FIG. 15, illustrated is a perspective view of the foot pedal 104 on the second articulating frame 106B, according to one example of the disclosed technology. The foot pedal 104 can receive the foot of the user. The foot pedal 104 can include a strapping mechanism that can secure the foot of the user. For example, the foot pedal 104 can include a Velcro strap (not shown) to secure the foot of the user to the foot pedal 104. In another example, the foot pedal 104 can include a shoe clip (not shown) that can lock into the base of the shoe of the user. The user can push the pivoting guide arm 102 along the roller strut 112 by applying a force to the foot pedal 104. The movement mechanism 1203 can roll along the roller strut 112. For example, as the user pushes the pivoting guide arm 102 towards the elbow connection 122, the movement apparatus (e.g., the rolling pins) can roll along the roller strut 112.

Figure 16:
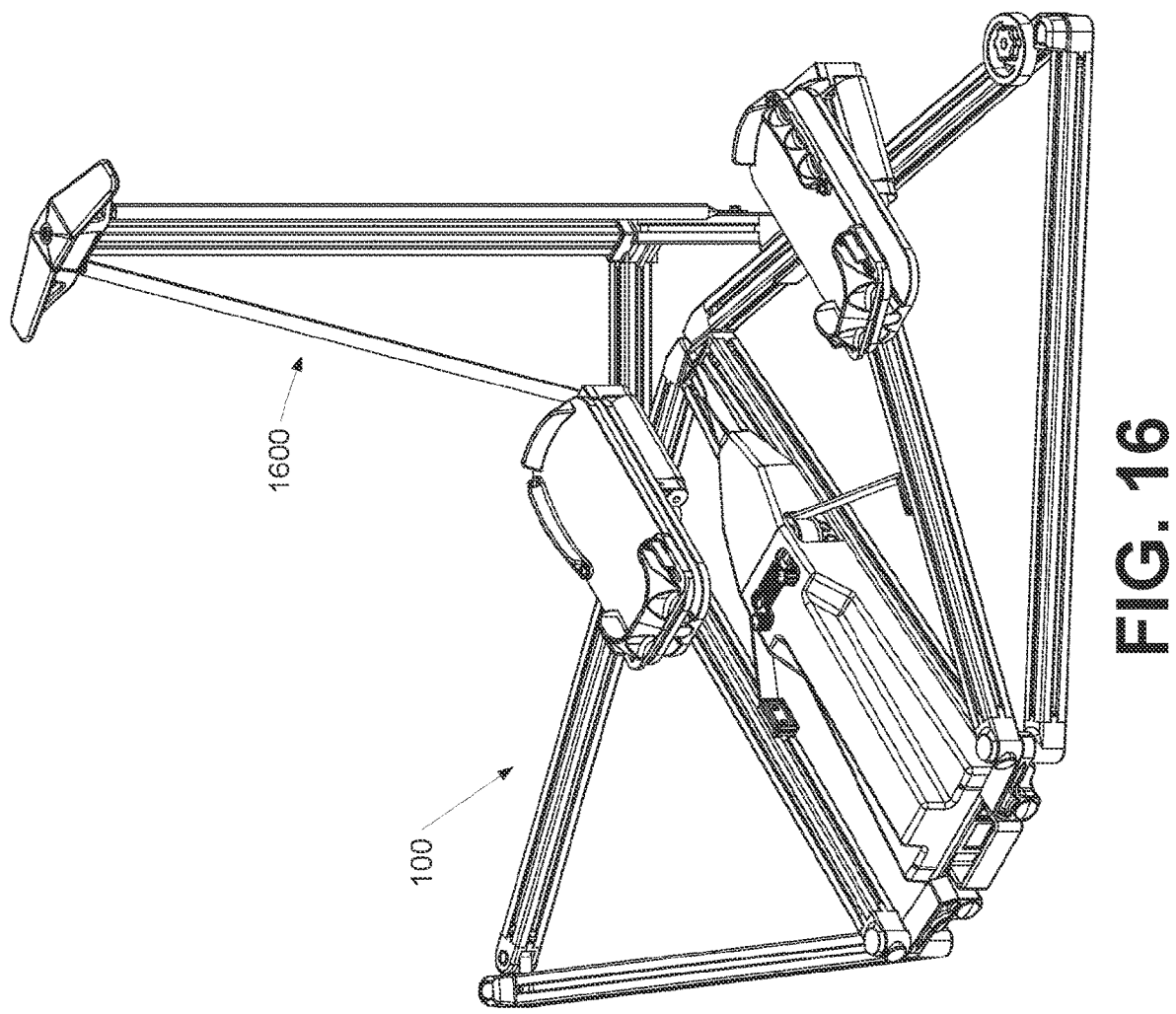
FIG. 16 illustrates a perspective view of the lateral motion system with a support structure, according to one example of the disclosed technology.

Referring now to FIG. 16, illustrated is a perspective view of the lateral motion system 100 with a support structure 1600. The support structure 1600 can function as a support system for the user of the lateral motion system 100. For example, the support structure can include one or more handles to support the user while performing an exercise. In another example, the support structure 1600 can include a display (not shown) for rendering exercise routines, performance metrics, and/or any other information associated with the lateral motion system 100. In yet another example, the support structure 1600 can include a beverage dispenser.

The lateral motion system 100 can include a computing system for monitoring activities on the lateral motion system 100, rendering data on the display, and/or performing any other particular computation associated with the lateral motion system 100. The computing system can include a local processing unit for performing sensor analyses, record data, and surface particular information on the display. For example, the lateral motion system 100 can employ the one or more sensors to gather diagnostics for the particular lateral motion system 100. The computing system can include a server system remotely connected to the local processing unit of the lateral motion system 100. For example, the local processing unit can send data recorded by the sensors to the server system to perform further processes. In another example, the server system can store one or more exercise routines, where the local processing unit can request a particular exercise routine for displaying on the display of the lateral motion system 100.

The foregoing description of the example embodiments has been presented only for the purposes of illustration and description and is not intended to be exhaustive or to limit the innovations to the precise forms disclosed. Many modifications and variations are possible in light of the above teaching.

The embodiments were chosen and described in order to explain the principles of the claimed innovations and their practical application so as to enable others skilled in the art to utilize the innovations and various embodiments and with various modifications as are suited to the particular use contemplated. Alternative embodiments will become apparent to those skilled in the art to which the claimed innovations pertain without departing from their spirit and scope. Accordingly, the scope of the claimed innovations is defined by the appended claims rather than the foregoing description and the example embodiments described therein.

What is claimed is:

1. An exercise apparatus, comprising:

an elongate core member having a proximal end and a distal end;

a pivoting guide arm rotationally coupled to the proximal end of the elongate core member via a pivoting joint, the pivoting guide arm comprising a foot pedal opposite the pivoting joint for securing a foot of a user;

a roller strut coupled to the distal end of the elongate core member, wherein the foot pedal of the pivoting guide arm is configured to roll or slide along the roller strut when the pivoting guide arm is pushed laterally away from the elongate core member;

a support strut rotationally coupled to the pivoting joint and extending outwardly from the elongate core member, wherein the support strut is rotationally coupled to the roller strut via an elbow connection; and a resistance system mounted to the elongate core member, the resistance system comprising a brake drum affixed to the elongate core member and having a friction strap threaded therethrough, the friction strap being affixed to the pivoting guide arm and rotationally coupled to the elongate core member, wherein the friction strap is configured to apply a friction force to the brake drum as the foot pedal of the pivoting guide arm is pushed laterally away from the elongate core member.

2. The exercise apparatus of claim 1, wherein the pivoting joint further comprises an outrigger having a first end and a second end, the outrigger being configured to:

rotationally couple to the elongate core member at the first end and rotationally couple to the support strut and the pivoting guide arm at the second end; and rotate about a horizontal axis at the first end.

3. The exercise apparatus of claim 2, wherein the roller strut is coupled to the distal end of the elongate core member via a locking joint, wherein the locking joint further comprises a removable locking pin that is further configured to:

secure the roller strut to the locking joint when in a locked position; and release the roller strut from the locking joint when in an unlocked position.

4. The exercise apparatus of claim 3, wherein the roller strut is configured to pivot, when in the unlocked position, towards the support strut about the elbow connection, and wherein the support strut and the pivoting guide arm are configured to pivot about the pivoting joint towards the elongate core member.

5. The exercise apparatus of claim 3, wherein the elbow connection is configured to be raised from a generally horizontal position by pivoting the outrigger and the support strut about the horizontal axis of the outrigger and pivoting the roller strut, when in the locked position, about the locking joint.

6. An exercise apparatus, comprising:

an elongate core member having a proximal end and a distal end;

a pivoting guide arm rotationally coupled to the proximal end of the elongate core member via a pivoting joint, the pivoting guide arm comprising a foot pedal opposite the pivoting joint for securing a foot of a user;

a resistance system mounted to the elongate core member, the resistance system comprising a brake drum affixed to the elongate core member and having a friction strap threaded therethrough, the friction strap being affixed to the pivoting guide arm and rotationally coupled to the elongate core member, wherein the friction strap is configured to apply a friction force to the brake drum as the foot pedal of the pivoting guide arm is pushed laterally away from the elongate core member;

a brake assembly base comprising a brake pin and a stationary brake pad, the brake pin and the stationary brake pad extending perpendicularly from the brake assembly base;

an attachment aperture in the brake drum, the brake assembly base being rotationally coupled to the brake drum by extending the brake pin through the attachment aperture; and a variable brake pad secured to the brake drum;

wherein the friction strap is operatively threaded between the brake drum and the stationary brake pad, wherein the friction strap is affixed to the pivoting guide arm at a first end and affixed to an elastic cord at a second end, wherein a stationary end of the elastic cord is rotationally coupled to the elongate core member.

7. The exercise apparatus of claim 6, wherein the friction force applied to the brake drum by the friction strap is configured to induce a torque onto the brake drum such that the brake drum rotates about the brake pin; and in response to the brake drum rotating about the brake pin, the brake drum is configured to generate a compression force on the friction strap by squeezing the friction strap between the variable brake pad and the stationary brake pad.

8. The exercise apparatus of claim 7, wherein:

the pivoting guide arm is configured to release a tension on the friction strap in response to the pivoting guide arm moving medially towards the elongate core member;

in response to releasing the tension on the friction strap, the elastic cord is configured to induce a return force on the pivoting guide arm through the friction strap, thereby reducing the torque on the brake drum; and in response to reducing the torque on the brake drum, the brake drum is configured to reduce the compression force between the between the variable brake pad and the stationary brake pad.

9. A lateral motion system for training lateral movements, comprising:

a core member having a proximal end and a distal end;

a pivoting guide arm rotationally coupled to the proximal end of the core member via a pivoting joint, the pivoting guide arm comprising a foot pedal opposite the pivoting joint for securing a foot of a user;

a resistance system mounted to the core member, the resistance system comprising a brake member affixed to the core member and having a friction strap coupled thereto, the friction strap being affixed to the pivoting guide arm and configured to apply a friction force to the brake member as the foot pedal of the pivoting guide arm is pushed laterally away from the core member;

a brake assembly base comprising a brake pin and a stationary brake pad, the brake pin and the stationary brake pad extending perpendicularly from the brake assembly base;

an attachment aperture in the brake member, the brake assembly base being rotationally coupled to the brake member by extending the brake pin through the attachment aperture; and a variable brake pad secured to the brake member;

wherein the friction strap is operatively threaded between the brake member and the stationary brake pad, wherein the friction strap is affixed to the pivoting guide arm at a first end and affixed to an elastic cord at a second end, wherein a stationary end of the elastic cord is rotationally coupled to the core member.

10. The lateral motion system of claim 9, wherein the friction force applied to the brake member by the friction strap is configured to induce a torque onto the brake member such that the brake member rotates about the brake pin; and in response to the brake member rotating about the brake pin, the brake member is configured to generate a compression force on the friction strap by squeezing the friction strap between the variable brake pad and the stationary brake pad.

11. The lateral motion system of claim 10, wherein:

the pivoting guide arm is configured to release a tension on the friction strap in response to the pivoting guide arm moving medially towards the core member;

in response to releasing the tension on the friction strap, the elastic cord is configured to induce a return force on the pivoting guide arm through the friction strap, thereby reducing the torque on the brake member; and in response to reducing the torque on the brake member, the brake member is configured to reduce the compression force between the between the variable brake pad and the stationary brake pad.

12. The lateral motion system of claim 9, wherein the brake member comprises a shape selected from the group consisting of a cylinder, a half cylinder, a cam, a rounded triangular prism, a rounded rectangular prism, and an arcuate shape.

13. The lateral motion system of claim 9, wherein the foot pedal includes a movement apparatus for enabling smooth movement of the pivoting guide arm, the movement apparatus comprising at least one of a roller ball bearing system, a rolling pin, a wheel, a slidable ball, or a slidable track assembly.

14. A training apparatus, comprising:

a friction resistance system, the friction resistance system further comprising:

a brake assembly base comprising a brake pin and a stationary brake pad, the brake pin and the stationary brake pad extending perpendicularly from the brake assembly base;

a brake drum comprising an attachment aperture, the brake assembly base rotationally coupled to the brake drum via the brake pin extended through the attachment aperture;

a variable brake pad secured to the brake drum via a sliding adjustment means; and a friction strap operatively threaded between the brake drum and the stationary brake pad, the friction strap fixed to a guide arm at a first end and fixed to base member at a second end.

15. The training apparatus of claim 14, wherein the training apparatus is further configured to:

pull the friction strap as the guide arm moves away from the friction resistance system;

in response to pulling the friction strap, the friction strap is configured to apply a frictional force onto the brake drum inducing a torque onto the brake drum such that the brake drum rotates about the brake pin; and in response to the brake drum rotating about the brake pin, the brake drum is configured to generate a compression force on the friction strap by pressing the variable brake pad into the friction strap and into the stationary brake pad.

16. The training apparatus of claim 15, wherein the training apparatus is further configured to:

release a tension on the friction strap in response to the guide arm moving towards the friction resistance system;

in response to releasing the tension on the friction strap, the elastic cord is configured to induce a return force on the guide arm through the friction strap;

in response to inducing the return force on the guide arm, the frictional force and the torque induced on the brake drum subsides; and in response to the frictional force and the torque subsiding, the brake drum is configured to reduce the compression between the variable brake pad and the stationary brake pad, releasing the friction strap and reducing the variable resistance force on the guide arm.

17. The training apparatus of claim 14, wherein the training apparatus comprises a lateral motion trainer configured to simulate the motion of ice skating or inline skating.

* * * * *